United States Patent
Xu

(10) Patent No.: US 9,090,956 B2
(45) Date of Patent: *Jul. 28, 2015

(54) ALUMINUM ALLOY POWDER METAL COMPACT

(75) Inventor: Zhiyue Xu, Cypress, TX (US)

(73) Assignee: Baker Hughes Incorporated, Houston, TX (US)

( * ) Notice: Subject to any disclaimer, the term of this patent is extended or adjusted under 35 U.S.C. 154(b) by 853 days.

This patent is subject to a terminal disclaimer.

(21) Appl. No.: 13/220,822

(22) Filed: Aug. 30, 2011

(65) Prior Publication Data

US 2013/0047784 A1   Feb. 28, 2013

(51) Int. Cl.
*C22C 23/00* (2006.01)
*C22C 29/02* (2006.01)
*C22C 29/12* (2006.01)
*C22C 29/16* (2006.01)
*C22C 49/04* (2006.01)
*C22C 21/06* (2006.01)
*C22C 21/14* (2006.01)
*C22C 21/16* (2006.01)
*C22C 21/18* (2006.01)
*C22C 21/12* (2006.01)
*C22C 1/04* (2006.01)
*C22C 29/00* (2006.01)
*C22C 32/00* (2006.01)
*B82Y 30/00* (2011.01)
(Continued)

(52) U.S. Cl.
CPC . *C22C 21/06* (2013.01); *B22F 1/02* (2013.01); *C22C 1/04* (2013.01); *C22C 21/12* (2013.01); *C22C 21/14* (2013.01); *C22C 21/16* (2013.01); *C22C 21/18* (2013.01); *C22C 29/00* (2013.01); *B22F 1/025* (2013.01); *B22F 2005/001* (2013.01); *B22F 2005/002* (2013.01); *B22F 2009/041* (2013.01); *B22F 2301/052* (2013.01); *B82Y 30/00* (2013.01); *C22C 1/0416* (2013.01); *C22C 23/00* (2013.01); *C22C 32/0036* (2013.01); *C22C 32/0047* (2013.01); *C22C 49/04* (2013.01)

(58) Field of Classification Search
None
See application file for complete search history.

(56) References Cited

U.S. PATENT DOCUMENTS 1,468,905 A   9/1923   Herman
2,238,895 A   4/1941   Gage
(Continued)

FOREIGN PATENT DOCUMENTS

CA   2783241 A1   6/2011
CA   2783346 A1   6/2011
(Continued)

OTHER PUBLICATIONS

Abdoulaye Seyni, Nadine Le Bolay, Sonia Molina-Boisseau, "On the interest of using degradable fillers in co-ground composite materials", Powder Technology 190, (2009) pp. 176-184.

(Continued)

*Primary Examiner* — George Wyszomierski
(74) *Attorney, Agent, or Firm* — Cantor Colburn LLP

(57) ABSTRACT

A powder metal compact is disclosed. The powder metal compact includes a cellular nanomatrix comprising a nanomatrix material. The powder metal compact also includes a plurality of dispersed particles comprising a particle core material that comprises an Al—Cu—Mg, Al—Mn, Al—Si, Al—Mg, Al—Mg—Si, Al—Zn, Al—Zn—Cu, Al—Zn—Mg, Al—Zn—Cr, Al—Zn—Zr, or Al—Sn—Li alloy, or a combination thereof, dispersed in the cellular nanomatrix.

28 Claims, 4 Drawing Sheets

(51) Int. Cl.
B22F 1/02    (2006.01)
B22F 5/00    (2006.01)
B22F 9/04    (2006.01)

(56) References Cited

U.S. PATENT DOCUMENTS

| | | | |
|---|---|---|---|
| 2,261,292 A | 11/1941 | Salnikov |
| 2,294,648 A | 9/1942 | Ansel et al. |
| 2,301,624 A | 11/1942 | Holt |
| 2,754,910 A | 7/1956 | Derrick et al. |
| 2,983,634 A | 5/1961 | Budininkas et al. |
| 3,057,405 A | 10/1962 | Mallinger |
| 3,106,959 A | 10/1963 | Huitt et al. |
| 3,152,009 A | 10/1964 | DeLong |
| 3,196,949 A | 7/1965 | Thomas |
| 3,242,988 A | 3/1966 | McGuire et al. |
| 3,316,748 A | 5/1967 | Lang et al. |
| 3,326,291 A | 6/1967 | Zandmer et al. |
| 3,347,317 A | 10/1967 | Zandemer |
| 3,347,714 A | 10/1967 | Broverman et al. |
| 3,390,724 A | 7/1968 | Caldwell |
| 3,395,758 A | 8/1968 | Kelly et al. |
| 3,406,101 A | 10/1968 | Kilpatrick |
| 3,434,537 A | 3/1969 | Zandmer |
| 3,465,181 A | 9/1969 | Colby et al. |
| 3,513,230 A | 5/1970 | Rhees et al. |
| 3,637,446 A | 1/1972 | Elliott et al. |
| 3,645,331 A | 2/1972 | Maurer et al. |
| 3,765,484 A | 10/1973 | Hamby, Jr. et al. |
| 3,768,563 A | 10/1973 | Blount |
| 3,775,823 A | 12/1973 | Adolph et al. |
| 3,878,889 A | 4/1975 | Seabourn |
| 3,894,850 A | 7/1975 | Kovalchuk et al. |
| 3,924,677 A | 12/1975 | Prenner et al. |
| 4,010,583 A | 3/1977 | Highberg |
| 4,039,717 A | 8/1977 | Titus |
| 4,050,529 A | 9/1977 | Tagirov et al. |
| 4,157,732 A | 6/1979 | Fonner |
| 4,248,307 A | 2/1981 | Silberman et al. |
| 4,372,384 A | 2/1983 | Kinney |
| 4,373,584 A | 2/1983 | Silberman et al. |
| 4,373,952 A | 2/1983 | Parent |
| 4,374,543 A | 2/1983 | Richardson |
| 4,384,616 A | 5/1983 | Dellinger |
| 4,395,440 A | 7/1983 | Abe et al. |
| 4,399,871 A | 8/1983 | Adkins et al. |
| 4,407,368 A | 10/1983 | Erbstoesser |
| 4,422,508 A | 12/1983 | Rutledge, Jr. et al. |
| 4,452,311 A | 6/1984 | Speegle et al. |
| 4,475,729 A | 10/1984 | Costigan |
| 4,498,543 A | 2/1985 | Pye et al. |
| 4,499,048 A | 2/1985 | Hanejko |
| 4,499,049 A | 2/1985 | Hanejko |
| 4,526,840 A | 7/1985 | Jerabek |
| 4,534,414 A | 8/1985 | Pringle |
| 4,539,175 A | 9/1985 | Lichti et al. |
| 4,554,986 A | 11/1985 | Jones |
| 4,640,354 A | 2/1987 | Boisson |
| 4,664,962 A | 5/1987 | DesMarais, Jr. |
| 4,668,470 A | 5/1987 | Gilman et al. |
| 4,673,549 A | 6/1987 | Ecer |
| 4,674,572 A | 6/1987 | Gallus |
| 4,678,037 A | 7/1987 | Smith |
| 4,681,133 A | 7/1987 | Weston |
| 4,688,641 A | 8/1987 | Knieriemen |
| 4,693,863 A | 9/1987 | Del Corso et al. |
| 4,703,807 A | 11/1987 | Weston |
| 4,706,753 A | 11/1987 | Ohkochi et al. |
| 4,708,202 A | 11/1987 | Sukup et al. |
| 4,708,208 A | 11/1987 | Halbardier |
| 4,709,761 A | 12/1987 | Setterberg, Jr. |
| 4,714,116 A | 12/1987 | Brunner |
| 4,716,964 A | 1/1988 | Erbstoesser et al. |
| 4,721,159 A | 1/1988 | Ohkochi et al. |
| 4,738,599 A | 4/1988 | Shilling |
| 4,741,973 A | 5/1988 | Condit et al. |
| 4,768,588 A | 9/1988 | Kupsa |
| 4,775,598 A | 10/1988 | Jaeckel |
| 4,784,226 A | 11/1988 | Wyatt |
| 4,805,699 A | 2/1989 | Halbardier |
| 4,817,725 A | 4/1989 | Jenkins |
| 4,834,184 A | 5/1989 | Streich et al. |
| H635 H | 6/1989 | Johnson et al. |
| 4,850,432 A | 7/1989 | Porter et al. |
| 4,853,056 A | 8/1989 | Hoffman |
| 4,869,324 A | 9/1989 | Holder |
| 4,869,325 A | 9/1989 | Halbardier |
| 4,889,187 A | 12/1989 | Terrell et al. |
| 4,890,675 A | 1/1990 | Dew |
| 4,909,320 A | 3/1990 | Hebert et al. |
| 4,929,415 A | 5/1990 | Okazaki |
| 4,932,474 A | 6/1990 | Schroeder, Jr. et al. |
| 4,938,309 A | 7/1990 | Emdy |
| 4,938,809 A | 7/1990 | Das et al. |
| 4,944,351 A | 7/1990 | Eriksen et al. |
| 4,949,788 A | 8/1990 | Szarka et al. |
| 4,952,902 A | 8/1990 | Kawaguchi et al. |
| 4,975,412 A | 12/1990 | Okazaki et al. |
| 4,977,958 A | 12/1990 | Miller |
| 4,981,177 A | 1/1991 | Carmody et al. |
| 4,986,361 A | 1/1991 | Mueller et al. |
| 4,997,622 A | 3/1991 | Regazzoni et al. |
| 5,006,044 A | 4/1991 | Walker, Sr. et al. |
| 5,010,955 A | 4/1991 | Springer |
| 5,036,921 A | 8/1991 | Pittard et al. |
| 5,048,611 A | 9/1991 | Cochran |
| 5,049,165 A | 9/1991 | Tselesin |
| 5,061,323 A | 10/1991 | DeLuccia |
| 5,063,775 A | 11/1991 | Walker, Sr. et al. |
| 5,073,207 A | 12/1991 | Faure et al. |
| 5,074,361 A | 12/1991 | Brisco et al. |
| 5,076,869 A | 12/1991 | Bourell et al. |
| 5,084,088 A | 1/1992 | Okazaki |
| 5,087,304 A | 2/1992 | Chang et al. |
| 5,090,480 A | 2/1992 | Pittard et al. |
| 5,095,988 A | 3/1992 | Bode |
| 5,103,911 A | 4/1992 | Heijnen |
| 5,117,915 A | 6/1992 | Mueller et al. |
| 5,161,614 A | 11/1992 | Wu et al. |
| 5,178,216 A | 1/1993 | Giroux et al. |
| 5,181,571 A | 1/1993 | Mueller et al. |
| 5,183,631 A | 2/1993 | Kugimiya et al. |
| 5,188,182 A | 2/1993 | Echols, III et al. |
| 5,188,183 A | 2/1993 | Hopmann et al. |
| 5,204,055 A | 4/1993 | Sachs et al. |
| 5,222,867 A | 6/1993 | Walker, Sr. et al. |
| 5,226,483 A | 7/1993 | Williamson, Jr. |
| 5,228,518 A | 7/1993 | Wilson et al. |
| 5,234,055 A | 8/1993 | Cornette |
| 5,252,365 A | 10/1993 | White |
| 5,253,714 A | 10/1993 | Davis et al. |
| 5,271,468 A | 12/1993 | Streich et al. |
| 5,282,509 A | 2/1994 | Schurr, III |
| 5,292,478 A | 3/1994 | Scorey |
| 5,293,940 A | 3/1994 | Hromas et al. |
| 5,304,260 A | 4/1994 | Aikawa et al. |
| 5,309,874 A | 5/1994 | Willermet et al. |
| 5,310,000 A | 5/1994 | Arterbury et al. |
| 5,316,598 A | 5/1994 | Chang et al. |
| 5,318,746 A | 6/1994 | Lashmore |
| 5,380,473 A | 1/1995 | Bogue et al. |
| 5,387,380 A | 2/1995 | Cima et al. |
| 5,392,860 A | 2/1995 | Ross |
| 5,394,941 A | 3/1995 | Venditto et al. |
| 5,398,754 A | 3/1995 | Dinhoble |
| 5,407,011 A | 4/1995 | Layton |
| 5,409,555 A | 4/1995 | Fujita et al. |
| 5,411,082 A | 5/1995 | Kennedy |
| 5,417,285 A | 5/1995 | Van Buskirk et al. |
| 5,425,424 A | 6/1995 | Reinhardt et al. |
| 5,427,177 A | 6/1995 | Jordan, Jr. et al. |
| 5,435,392 A | 7/1995 | Kennedy |
| 5,439,051 A | 8/1995 | Kennedy et al. |
| 5,454,430 A | 10/1995 | Kennedy et al. |

(56) References Cited

U.S. PATENT DOCUMENTS

| | | |
|---|---|---|
| 5,456,317 A | 10/1995 | Hood, III et al. |
| 5,456,327 A | 10/1995 | Denton et al. |
| 5,464,062 A | 11/1995 | Blizzard, Jr. |
| 5,472,048 A | 12/1995 | Kennedy et al. |
| 5,474,131 A | 12/1995 | Jordan, Jr. et al. |
| 5,477,923 A | 12/1995 | Jordan, Jr. et al. |
| 5,479,986 A | 1/1996 | Gano et al. |
| 5,507,439 A | 4/1996 | Story |
| 5,526,880 A | 6/1996 | Jordan, Jr. et al. |
| 5,526,881 A | 6/1996 | Martin et al. |
| 5,529,746 A | 6/1996 | Knoss et al. |
| 5,533,573 A | 7/1996 | Jordan, Jr. et al. |
| 5,536,485 A | 7/1996 | Kume et al. |
| 5,558,153 A | 9/1996 | Holcombe et al. |
| 5,607,017 A | 3/1997 | Owens et al. |
| 5,623,993 A | 4/1997 | Van Buskirk et al. |
| 5,623,994 A | 4/1997 | Robinson |
| 5,636,691 A | 6/1997 | Hendrickson et al. |
| 5,641,023 A | 6/1997 | Ross et al. |
| 5,647,444 A | 7/1997 | Williams |
| 5,665,289 A | 9/1997 | Chung et al. |
| 5,677,372 A | 10/1997 | Yamamoto et al. |
| 5,685,372 A | 11/1997 | Gano |
| 5,701,576 A | 12/1997 | Fujita et al. |
| 5,707,214 A | 1/1998 | Schmidt |
| 5,709,269 A | 1/1998 | Head |
| 5,720,344 A | 2/1998 | Newman |
| 5,728,195 A | 3/1998 | Eastman et al. |
| 5,765,639 A | 6/1998 | Muth |
| 5,772,735 A | 6/1998 | Sehgal et al. |
| 5,782,305 A | 7/1998 | Hicks |
| 5,797,454 A | 8/1998 | Hipp |
| 5,826,652 A | 10/1998 | Tapp |
| 5,826,661 A | 10/1998 | Parker et al. |
| 5,829,520 A | 11/1998 | Johnson |
| 5,836,396 A | 11/1998 | Norman |
| 5,857,521 A | 1/1999 | Ross et al. |
| 5,881,816 A | 3/1999 | Wright |
| 5,896,819 A | 4/1999 | Turila et al. |
| 5,902,424 A | 5/1999 | Fujita et al. |
| 5,934,372 A | 8/1999 | Muth |
| 5,941,309 A | 8/1999 | Appleton |
| 5,960,881 A | 10/1999 | Allamon et al. |
| 5,985,466 A | 11/1999 | Atarashi et al. |
| 5,990,051 A | 11/1999 | Ischy et al. |
| 5,992,452 A | 11/1999 | Nelson, II |
| 5,992,520 A | 11/1999 | Schultz et al. |
| 6,007,314 A | 12/1999 | Nelson, II |
| 6,024,915 A | 2/2000 | Kume et al. |
| 6,032,735 A | 3/2000 | Echols |
| 6,036,777 A | 3/2000 | Sachs |
| 6,047,773 A | 4/2000 | Zeltmann et al. |
| 6,050,340 A | 4/2000 | Scott |
| 6,069,313 A | 5/2000 | Kay |
| 6,076,600 A | 6/2000 | Vick, Jr. et al. |
| 6,079,496 A | 6/2000 | Hirth |
| 6,085,837 A | 7/2000 | Massinon et al. |
| 6,095,247 A | 8/2000 | Streich et al. |
| 6,119,783 A | 9/2000 | Parker et al. |
| 6,142,237 A | 11/2000 | Christmas et al. |
| 6,161,622 A | 12/2000 | Robb et al. |
| 6,167,970 B1 | 1/2001 | Stout et al. |
| 6,170,583 B1 | 1/2001 | Boyce |
| 6,173,779 B1 | 1/2001 | Smith |
| 6,189,616 B1 | 2/2001 | Gano et al. |
| 6,189,618 B1 | 2/2001 | Beeman et al. |
| 6,213,202 B1 | 4/2001 | Read, Jr. |
| 6,220,350 B1 | 4/2001 | Brothers et al. |
| 6,220,357 B1 | 4/2001 | Carmichael |
| 6,228,904 B1 | 5/2001 | Yadav et al. |
| 6,237,688 B1 | 5/2001 | Burleson et al. |
| 6,238,280 B1 | 5/2001 | Ritt et al. |
| 6,241,021 B1 | 6/2001 | Bowling |
| 6,248,399 B1 | 6/2001 | Hehmann |
| 6,250,392 B1 | 6/2001 | Muth |
| 6,261,432 B1 | 7/2001 | Huber et al. |
| 6,273,187 B1 | 8/2001 | Voisin, Jr. et al. |
| 6,276,452 B1 | 8/2001 | Davis et al. |
| 6,276,457 B1 | 8/2001 | Moffatt et al. |
| 6,279,656 B1 | 8/2001 | Sinclair et al. |
| 6,287,445 B1 | 9/2001 | Lashmore et al. |
| 6,302,205 B1 | 10/2001 | Ryll |
| 6,315,041 B1 | 11/2001 | Carlisle et al. |
| 6,315,050 B2 | 11/2001 | Vaynshteyn et al. |
| 6,325,148 B1 | 12/2001 | Trahan et al. |
| 6,328,110 B1 | 12/2001 | Joubert |
| 6,341,653 B1 | 1/2002 | Firmaniuk et al. |
| 6,341,747 B1 | 1/2002 | Schmidt et al. |
| 6,349,766 B1 | 2/2002 | Bussear et al. |
| 6,354,379 B2 | 3/2002 | Miszewski et al. |
| 6,357,322 B1 | 3/2002 | Dolan et al. |
| 6,357,332 B1 | 3/2002 | Vecchio |
| 6,371,206 B1 | 4/2002 | Mills |
| 6,372,346 B1 | 4/2002 | Toth |
| 6,382,244 B2 | 5/2002 | Vann |
| 6,390,195 B1 | 5/2002 | Nguyen et al. |
| 6,390,200 B1 | 5/2002 | Allamon et al. |
| 6,394,185 B1 | 5/2002 | Constien |
| 6,397,950 B1 | 6/2002 | Streich et al. |
| 6,403,210 B1 | 6/2002 | Stuivinga et al. |
| 6,408,946 B1 | 6/2002 | Marshall et al. |
| 6,419,023 B1 | 7/2002 | George et al. |
| 6,439,313 B1 | 8/2002 | Thomeer et al. |
| 6,457,525 B1 | 10/2002 | Scott |
| 6,467,546 B2 | 10/2002 | Allamon et al. |
| 6,470,965 B1 | 10/2002 | Winzer |
| 6,491,097 B1 | 12/2002 | ONeal et al. |
| 6,491,116 B2 | 12/2002 | Berscheidt et al. |
| 6,513,598 B2 | 2/2003 | Moore et al. |
| 6,540,033 B1 | 4/2003 | Sullivan et al. |
| 6,543,543 B2 | 4/2003 | Muth |
| 6,561,275 B2 | 5/2003 | Glass et al. |
| 6,588,507 B2 | 7/2003 | Dusterhoft et al. |
| 6,591,915 B2 | 7/2003 | Burris et al. |
| 6,601,648 B2 | 8/2003 | Ebinger |
| 6,601,650 B2 | 8/2003 | Sundararajan |
| 6,609,569 B2 | 8/2003 | Howlett et al. |
| 6,612,826 B1 | 9/2003 | Bauer et al. |
| 6,613,383 B1 | 9/2003 | George et al. |
| 6,619,400 B2 | 9/2003 | Brunet |
| 6,634,428 B2 | 10/2003 | Krauss et al. |
| 6,662,886 B2 | 12/2003 | Russell |
| 6,675,889 B1 | 1/2004 | Mullins et al. |
| 6,699,305 B2 | 3/2004 | Myrick |
| 6,713,177 B2 | 3/2004 | George et al. |
| 6,715,541 B2 | 4/2004 | Pedersen et al. |
| 6,719,051 B2 | 4/2004 | Hailey, Jr. et al. |
| 6,755,249 B2 | 6/2004 | Robison et al. |
| 6,776,228 B2 | 8/2004 | Pedersen et al. |
| 6,779,599 B2 | 8/2004 | Mullins et al. |
| 6,799,638 B2 | 10/2004 | Butterfield, Jr. |
| 6,810,960 B2 | 11/2004 | Pia |
| 6,817,414 B2 | 11/2004 | Lee |
| 6,831,044 B2 | 12/2004 | Constien |
| 6,883,611 B2 | 4/2005 | Smith et al. |
| 6,887,297 B2 | 5/2005 | Winter et al. |
| 6,896,049 B2 | 5/2005 | Moyes |
| 6,896,061 B2 | 5/2005 | Hriscu et al. |
| 6,899,176 B2 | 5/2005 | Hailey, Jr. et al. |
| 6,899,777 B2 | 5/2005 | Vaidyanathan et al. |
| 6,908,516 B2 | 6/2005 | Hehmann et al. |
| 6,913,827 B2 | 7/2005 | George et al. |
| 6,926,086 B2 | 8/2005 | Patterson et al. |
| 6,932,159 B2 | 8/2005 | Hovem |
| 6,939,388 B2 | 9/2005 | Angeliu |
| 6,945,331 B2 | 9/2005 | Patel |
| 6,951,331 B2 | 10/2005 | Haughom et al. |
| 6,959,759 B2 | 11/2005 | Doane et al. |
| 6,973,970 B2 | 12/2005 | Johnston et al. |
| 6,973,973 B2 | 12/2005 | Howard et al. |
| 6,983,796 B2 | 1/2006 | Bayne et al. |
| 6,986,390 B2 | 1/2006 | Doane et al. |
| 7,013,989 B2 | 3/2006 | Hammond et al. |
| 7,013,998 B2 | 3/2006 | Ray et al. |

(56) References Cited

U.S. PATENT DOCUMENTS

| | | |
|---|---|---|
| 7,017,664 B2 | 3/2006 | Walker et al. |
| 7,017,677 B2 | 3/2006 | Keshavan et al. |
| 7,021,389 B2 | 4/2006 | Bishop et al. |
| 7,025,146 B2 | 4/2006 | King et al. |
| 7,028,778 B2 | 4/2006 | Krywitsky |
| 7,044,230 B2 | 5/2006 | Starr et al. |
| 7,049,272 B2 | 5/2006 | Sinclair et al. |
| 7,051,805 B2 | 5/2006 | Doane et al. |
| 7,059,410 B2 | 6/2006 | Bousche et al. |
| 7,090,027 B1 | 8/2006 | Williams |
| 7,093,664 B2 | 8/2006 | Todd et al. |
| 7,096,945 B2 | 8/2006 | Richards et al. |
| 7,096,946 B2 | 8/2006 | Jasser et al. |
| 7,097,906 B2 | 8/2006 | Gardner |
| 7,108,080 B2 | 9/2006 | Tessari et al. |
| 7,111,682 B2 | 9/2006 | Blaisdell |
| 7,141,207 B2 | 11/2006 | Jandeska, Jr. et al. |
| 7,150,326 B2 | 12/2006 | Bishop et al. |
| 7,163,066 B2 | 1/2007 | Lehr |
| 7,168,494 B2 | 1/2007 | Starr et al. |
| 7,174,963 B2 | 2/2007 | Bertelsen |
| 7,182,135 B2 | 2/2007 | Szarka |
| 7,188,559 B1 | 3/2007 | Vecchio |
| 7,210,527 B2 | 5/2007 | Walker et al. |
| 7,210,533 B2 | 5/2007 | Starr et al. |
| 7,217,311 B2 | 5/2007 | Hong et al. |
| 7,234,530 B2 | 6/2007 | Gass |
| 7,250,188 B2 | 7/2007 | Dodelet et al. |
| 7,252,162 B2 | 8/2007 | Akinlade et al. |
| 7,255,172 B2 | 8/2007 | Johnson |
| 7,255,178 B2 | 8/2007 | Slup et al. |
| 7,264,060 B2 | 9/2007 | Wills |
| 7,267,172 B2 | 9/2007 | Hofman |
| 7,267,178 B2 | 9/2007 | Krywitsky |
| 7,270,186 B2 | 9/2007 | Johnson |
| 7,287,592 B2 | 10/2007 | Surjaatmadja et al. |
| 7,311,152 B2 | 12/2007 | Howard et al. |
| 7,320,365 B2 | 1/2008 | Pia |
| 7,322,412 B2 | 1/2008 | Badalamenti et al. |
| 7,322,417 B2 | 1/2008 | Rytlewski et al. |
| 7,325,617 B2 | 2/2008 | Murray |
| 7,328,750 B2 | 2/2008 | Swor et al. |
| 7,331,388 B2 | 2/2008 | Vilela et al. |
| 7,337,854 B2 | 3/2008 | Horn et al. |
| 7,346,456 B2 | 3/2008 | Le Bemadjiel |
| 7,350,582 B2 | 4/2008 | McKeachnie et al. |
| 7,353,879 B2 | 4/2008 | Todd et al. |
| 7,360,593 B2 | 4/2008 | Constien |
| 7,360,597 B2 | 4/2008 | Blaisdell |
| 7,363,970 B2 | 4/2008 | Corre et al. |
| 7,384,443 B2 | 6/2008 | Mirchandani |
| 7,387,158 B2 | 6/2008 | Murray et al. |
| 7,387,165 B2 | 6/2008 | Lopez de Cardenas et al. |
| 7,392,841 B2 | 7/2008 | Murray et al. |
| 7,401,648 B2 | 7/2008 | Richard |
| 7,416,029 B2 | 8/2008 | Telfer et al. |
| 7,422,058 B2 | 9/2008 | O'Malley |
| 7,426,964 B2 | 9/2008 | Lynde et al. |
| 7,441,596 B2 | 10/2008 | Wood et al. |
| 7,445,049 B2 | 11/2008 | Howard et al. |
| 7,451,815 B2 | 11/2008 | Hailey, Jr. |
| 7,451,817 B2 | 11/2008 | Reddy et al. |
| 7,461,699 B2 | 12/2008 | Richard et al. |
| 7,464,764 B2 | 12/2008 | Xu |
| 7,472,750 B2 | 1/2009 | Walker et al. |
| 7,478,676 B2 | 1/2009 | East, Jr. et al. |
| 7,503,390 B2 | 3/2009 | Gomez |
| 7,503,399 B2 | 3/2009 | Badalamenti et al. |
| 7,509,993 B1 | 3/2009 | Turng et al. |
| 7,510,018 B2 | 3/2009 | Williamson et al. |
| 7,513,311 B2 | 4/2009 | Gramstad et al. |
| 7,527,103 B2 | 5/2009 | Huang et al. |
| 7,537,825 B1 | 5/2009 | Wardle et al. |
| 7,552,777 B2 | 6/2009 | Murray et al. |
| 7,552,779 B2 | 6/2009 | Murray |
| 7,559,357 B2 | 7/2009 | Clem |
| 7,575,062 B2 | 8/2009 | East, Jr. |
| 7,579,087 B2 | 8/2009 | Maloney et al. |
| 7,591,318 B2 | 9/2009 | Tilghman |
| 7,600,572 B2 | 10/2009 | Slup et al. |
| 7,604,049 B2 | 10/2009 | Vaidya et al. |
| 7,604,055 B2 | 10/2009 | Richard et al. |
| 7,617,871 B2 | 11/2009 | Surjaatmadja et al. |
| 7,635,023 B2 | 12/2009 | Goldberg et al. |
| 7,640,988 B2 | 1/2010 | Phi et al. |
| 7,661,480 B2 | 2/2010 | Al-Anazi |
| 7,661,481 B2 | 2/2010 | Todd et al. |
| 7,665,537 B2 | 2/2010 | Patel et al. |
| 7,686,082 B2 | 3/2010 | Marsh |
| 7,690,436 B2 | 4/2010 | Turley et al. |
| 7,699,101 B2 | 4/2010 | Fripp et al. |
| 7,703,510 B2 | 4/2010 | Xu |
| 7,703,511 B2 | 4/2010 | Buyers et al. |
| 7,708,078 B2 | 5/2010 | Stoesz |
| 7,709,421 B2 | 5/2010 | Jones et al. |
| 7,712,541 B2 | 5/2010 | Loretz et al. |
| 7,723,272 B2 | 5/2010 | Crews et al. |
| 7,726,406 B2 | 6/2010 | Xu |
| 7,735,578 B2 | 6/2010 | Loehr et al. |
| 7,752,971 B2 | 7/2010 | Loehr |
| 7,757,773 B2 | 7/2010 | Rytlewski |
| 7,762,342 B2 | 7/2010 | Richard et al. |
| 7,770,652 B2 | 8/2010 | Barnett |
| 7,775,284 B2 | 8/2010 | Richards et al. |
| 7,775,286 B2 | 8/2010 | Duphorne |
| 7,784,543 B2 | 8/2010 | Johnson |
| 7,793,714 B2 | 9/2010 | Johnson |
| 7,798,225 B2 | 9/2010 | Giroux et al. |
| 7,798,226 B2 | 9/2010 | Themig |
| 7,798,236 B2 | 9/2010 | McKeachnie et al. |
| 7,806,189 B2 | 10/2010 | Frazier |
| 7,806,192 B2 | 10/2010 | Foster et al. |
| 7,810,553 B2 | 10/2010 | Cruickshank et al. |
| 7,810,567 B2 | 10/2010 | Daniels et al. |
| 7,819,198 B2 | 10/2010 | Birckhea et al. |
| 7,828,055 B2 | 11/2010 | Willauer et al. |
| 7,833,944 B2 | 11/2010 | Munoz et al. |
| 7,849,927 B2 | 12/2010 | Herrera |
| 7,855,168 B2 | 12/2010 | Fuller et al. |
| 7,861,779 B2 | 1/2011 | Vestavik |
| 7,861,781 B2 | 1/2011 | D'Arcy |
| 7,874,365 B2 | 1/2011 | East, Jr. et al. |
| 7,878,253 B2 | 2/2011 | Stowe et al. |
| 7,896,091 B2 | 3/2011 | Williamson et al. |
| 7,897,063 B1 | 3/2011 | Perry et al. |
| 7,900,696 B1 | 3/2011 | Nish et al. |
| 7,900,703 B2 | 3/2011 | Clark et al. |
| 7,909,096 B2 | 3/2011 | Clark et al. |
| 7,909,104 B2 | 3/2011 | Bjorgum |
| 7,909,110 B2 | 3/2011 | Sharma et al. |
| 7,909,115 B2 | 3/2011 | Grove et al. |
| 7,913,765 B2 | 3/2011 | Crow et al. |
| 7,918,275 B2 | 4/2011 | Clem |
| 7,931,093 B2 | 4/2011 | Foster et al. |
| 7,938,191 B2 | 5/2011 | Vaidya |
| 7,946,335 B2 | 5/2011 | Bewlay et al. |
| 7,946,340 B2 | 5/2011 | Surjaatmadja et al. |
| 7,958,940 B2 | 6/2011 | Jameson |
| 7,963,331 B2 | 6/2011 | Surjaatmadja et al. |
| 7,963,340 B2 | 6/2011 | Gramstad et al. |
| 7,963,342 B2 | 6/2011 | George |
| 7,980,300 B2 | 7/2011 | Roberts et al. |
| 7,987,906 B1 | 8/2011 | Troy |
| 7,992,763 B2 | 8/2011 | Vecchio et al. |
| 8,020,619 B1 | 9/2011 | Robertson et al. |
| 8,020,620 B2 | 9/2011 | Daniels et al. |
| 8,025,104 B2 | 9/2011 | Cooke, Jr. |
| 8,028,767 B2 | 10/2011 | Radford et al. |
| 8,033,331 B2 | 10/2011 | Themig |
| 8,039,422 B1 | 10/2011 | Al-Zahrani |
| 8,056,628 B2 | 11/2011 | Whitsitt et al. |
| 8,056,638 B2 | 11/2011 | Clayton et al. |
| 8,109,340 B2 | 2/2012 | Doane et al. |
| 8,127,856 B1 | 3/2012 | Nish et al. |

(56) References Cited

U.S. PATENT DOCUMENTS

| | | | |
|---|---|---|---|
| 8,153,052 B2 | 4/2012 | Jackson et al. | |
| 8,163,060 B2 | 4/2012 | Imanishi et al. | |
| 8,211,247 B2 | 7/2012 | Marya et al. | |
| 8,211,248 B2 | 7/2012 | Marya | |
| 8,226,740 B2 | 7/2012 | Chaumonnot et al. | |
| 8,230,731 B2 | 7/2012 | Dyer et al. | |
| 8,231,947 B2 | 7/2012 | Vaidya et al. | |
| 8,276,670 B2 | 10/2012 | Patel | |
| 8,277,974 B2 | 10/2012 | Kumar et al. | |
| 8,297,364 B2 * | 10/2012 | Agrawal et al. | 166/376 |
| 8,327,931 B2 | 12/2012 | Agrawal et al. | |
| 8,403,037 B2 | 3/2013 | Agrawal et al. | |
| 8,425,651 B2 * | 4/2013 | Xu et al. | 75/245 |
| 2001/0045285 A1 | 11/2001 | Russell | |
| 2001/0045288 A1 | 11/2001 | Allamon et al. | |
| 2002/0000319 A1 | 1/2002 | Brunet | |
| 2002/0007948 A1 | 1/2002 | Bayne et al. | |
| 2002/0014268 A1 | 2/2002 | Vann | |
| 2002/0066572 A1 | 6/2002 | Muth | |
| 2002/0104616 A1 | 8/2002 | De et al. | |
| 2002/0136904 A1 | 9/2002 | Glass et al. | |
| 2002/0162661 A1 | 11/2002 | Krauss et al. | |
| 2003/0037925 A1 | 2/2003 | Walker et al. | |
| 2003/0060374 A1 | 3/2003 | Cooke, Jr. | |
| 2003/0075326 A1 | 4/2003 | Ebinger | |
| 2003/0104147 A1 | 6/2003 | Bretschneider et al. | |
| 2003/0111728 A1 | 6/2003 | Thai et al. | |
| 2003/0127013 A1 | 7/2003 | Zavitsanos et al. | |
| 2003/0141060 A1 | 7/2003 | Hailey et al. | |
| 2003/0141061 A1 | 7/2003 | Hailey et al. | |
| 2003/0141079 A1 | 7/2003 | Doane et al. | |
| 2003/0150614 A1 | 8/2003 | Brown et al. | |
| 2003/0155114 A1 | 8/2003 | Pedersen et al. | |
| 2003/0155115 A1 | 8/2003 | Pedersen et al. | |
| 2003/0159828 A1 | 8/2003 | Howard et al. | |
| 2003/0164237 A1 | 9/2003 | Butterfield | |
| 2003/0183391 A1 | 10/2003 | Hriscu et al. | |
| 2004/0005483 A1 | 1/2004 | Lin | |
| 2004/0020832 A1 | 2/2004 | Richards et al. | |
| 2004/0031605 A1 | 2/2004 | Mickey | |
| 2004/0045723 A1 | 3/2004 | Slup et al. | |
| 2004/0055758 A1 | 3/2004 | Brezinski et al. | |
| 2004/0089449 A1 | 5/2004 | Walton et al. | |
| 2004/0154806 A1 | 8/2004 | Bode et al. | |
| 2004/0159428 A1 | 8/2004 | Hammond et al. | |
| 2004/0182583 A1 | 9/2004 | Doane et al. | |
| 2004/0231845 A1 | 11/2004 | Cooke, Jr. | |
| 2004/0256109 A1 | 12/2004 | Johnson | |
| 2004/0256157 A1 | 12/2004 | Tessari et al. | |
| 2004/0261993 A1 | 12/2004 | Nguyen | |
| 2005/0034876 A1 | 2/2005 | Doane et al. | |
| 2005/0051329 A1 | 3/2005 | Blaisdell | |
| 2005/0064247 A1 | 3/2005 | Sane et al. | |
| 2005/0069449 A1 | 3/2005 | Jackson et al. | |
| 2005/0102255 A1 | 5/2005 | Bultman | |
| 2005/0106316 A1 | 5/2005 | Rigney et al. | |
| 2005/0161212 A1 | 7/2005 | Leismer et al. | |
| 2005/0161224 A1 | 7/2005 | Starr et al. | |
| 2005/0165149 A1 | 7/2005 | Chanak et al. | |
| 2005/0194143 A1 | 9/2005 | Xu et al. | |
| 2005/0199401 A1 | 9/2005 | Patel et al. | |
| 2005/0205264 A1 | 9/2005 | Starr et al. | |
| 2005/0205265 A1 | 9/2005 | Todd et al. | |
| 2005/0205266 A1 | 9/2005 | Todd et al. | |
| 2005/0241824 A1 | 11/2005 | Burris, II et al. | |
| 2005/0241825 A1 | 11/2005 | Burris, II et al. | |
| 2005/0257936 A1 | 11/2005 | Lehr | |
| 2005/0279501 A1 | 12/2005 | Surjaatmadja et al. | |
| 2006/0012087 A1 | 1/2006 | Matsuda et al. | |
| 2006/0045787 A1 | 3/2006 | Jandeska, Jr. et al. | |
| 2006/0057479 A1 | 3/2006 | Niimi et al. | |
| 2006/0081378 A1 | 4/2006 | Howard et al. | |
| 2006/0102871 A1 | 5/2006 | Wang et al. | |
| 2006/0108114 A1 | 5/2006 | Johnson et al. | |
| 2006/0108126 A1 | 5/2006 | Horn et al. | |
| 2006/0110615 A1 | 5/2006 | Karim et al. | |
| 2006/0116696 A1 | 6/2006 | Odermatt et al. | |
| 2006/0124310 A1 | 6/2006 | Lopez de Cardenas | |
| 2006/0131011 A1 | 6/2006 | Lynde et al. | |
| 2006/0131031 A1 | 6/2006 | McKeachnie et al. | |
| 2006/0131081 A1 | 6/2006 | Mirchandani et al. | |
| 2006/0134312 A1 | 6/2006 | Dekker et al. | |
| 2006/0144515 A1 | 7/2006 | Tada et al. | |
| 2006/0150770 A1 | 7/2006 | Freim, III et al. | |
| 2006/0151178 A1 | 7/2006 | Howard et al. | |
| 2006/0162927 A1 | 7/2006 | Walker et al. | |
| 2006/0169453 A1 | 8/2006 | Savery et al. | |
| 2006/0207763 A1 | 9/2006 | Hofman et al. | |
| 2006/0213670 A1 | 9/2006 | Bishop et al. | |
| 2006/0231253 A1 | 10/2006 | Vilela et al. | |
| 2006/0283592 A1 | 12/2006 | Sierra et al. | |
| 2007/0017674 A1 | 1/2007 | Blaisdell | |
| 2007/0017675 A1 | 1/2007 | Hammami et al. | |
| 2007/0029082 A1 | 2/2007 | Giroux et al. | |
| 2007/0039741 A1 | 2/2007 | Hailey | |
| 2007/0044958 A1 | 3/2007 | Rytlewski et al. | |
| 2007/0044966 A1 | 3/2007 | Davies et al. | |
| 2007/0051521 A1 | 3/2007 | Fike et al. | |
| 2007/0053785 A1 | 3/2007 | Hetz et al. | |
| 2007/0054101 A1 | 3/2007 | Sigalas et al. | |
| 2007/0057415 A1 | 3/2007 | Katagiri et al. | |
| 2007/0062644 A1 | 3/2007 | Nakamura et al. | |
| 2007/0074873 A1 | 4/2007 | McKeachnie et al. | |
| 2007/0102199 A1 | 5/2007 | Smith et al. | |
| 2007/0107899 A1 | 5/2007 | Werner et al. | |
| 2007/0107908 A1 | 5/2007 | Vaidya et al. | |
| 2007/0108060 A1 | 5/2007 | Park | |
| 2007/0119600 A1 | 5/2007 | Slup et al. | |
| 2007/0131912 A1 | 6/2007 | Simone et al. | |
| 2007/0151009 A1 | 7/2007 | Conrad, III et al. | |
| 2007/0151769 A1 | 7/2007 | Slutz et al. | |
| 2007/0169935 A1 | 7/2007 | Akbar et al. | |
| 2007/0181224 A1 | 8/2007 | Marya et al. | |
| 2007/0185655 A1 | 8/2007 | Le Bemadjiel | |
| 2007/0187095 A1 | 8/2007 | Walker et al. | |
| 2007/0221373 A1 | 9/2007 | Murray | |
| 2007/0221384 A1 | 9/2007 | Murray | |
| 2007/0259994 A1 | 11/2007 | Tour et al. | |
| 2007/0261862 A1 | 11/2007 | Murray | |
| 2007/0272411 A1 | 11/2007 | Lopez de Cardenas et al. | |
| 2007/0272413 A1 | 11/2007 | Rytlewski et al. | |
| 2007/0277979 A1 | 12/2007 | Todd et al. | |
| 2007/0284109 A1 | 12/2007 | East et al. | |
| 2007/0284112 A1 | 12/2007 | Magne et al. | |
| 2007/0299510 A1 | 12/2007 | Venkatraman et al. | |
| 2008/0011473 A1 | 1/2008 | Wood et al. | |
| 2008/0020923 A1 | 1/2008 | Debe et al. | |
| 2008/0047707 A1 | 2/2008 | Boney et al. | |
| 2008/0060810 A9 | 3/2008 | Nguyen et al. | |
| 2008/0066923 A1 | 3/2008 | Xu | |
| 2008/0066924 A1 | 3/2008 | Xu | |
| 2008/0078553 A1 | 4/2008 | George | |
| 2008/0081866 A1 | 4/2008 | Gong et al. | |
| 2008/0099209 A1 | 5/2008 | Loretz et al. | |
| 2008/0105438 A1 | 5/2008 | Jordan et al. | |
| 2008/0115932 A1 | 5/2008 | Cooke | |
| 2008/0121390 A1 | 5/2008 | O'Malley et al. | |
| 2008/0121436 A1 | 5/2008 | Slay et al. | |
| 2008/0127475 A1 | 6/2008 | Griffo | |
| 2008/0135249 A1 | 6/2008 | Fripp et al. | |
| 2008/0149325 A1 | 6/2008 | Crawford | |
| 2008/0149345 A1 | 6/2008 | Marya et al. | |
| 2008/0149351 A1 | 6/2008 | Marya et al. | |
| 2008/0169105 A1 | 7/2008 | Williamson et al. | |
| 2008/0179104 A1 | 7/2008 | Zhang et al. | |
| 2008/0202764 A1 | 8/2008 | Clayton et al. | |
| 2008/0202814 A1 | 8/2008 | Lyons et al. | |
| 2008/0210473 A1 | 9/2008 | Zhang et al. | |
| 2008/0216383 A1 * | 9/2008 | Pierick et al. | 43/18.1 R |
| 2008/0223586 A1 | 9/2008 | Barnett | |
| 2008/0223587 A1 | 9/2008 | Cherewyk | |
| 2008/0236829 A1 | 10/2008 | Lynde | |
| 2008/0248205 A1 | 10/2008 | Blanchet et al. | |
| 2008/0277109 A1 | 11/2008 | Vaidya | |

(56) References Cited

U.S. PATENT DOCUMENTS

| | | |
|---|---|---|
| 2008/0277980 A1 | 11/2008 | Koda et al. |
| 2008/0282924 A1 | 11/2008 | Saenger et al. |
| 2008/0296024 A1 | 12/2008 | Huang et al. |
| 2008/0314581 A1 | 12/2008 | Brown |
| 2008/0314588 A1 | 12/2008 | Langlais et al. |
| 2009/0038858 A1 | 2/2009 | Griffo et al. |
| 2009/0044946 A1 | 2/2009 | Schasteen et al. |
| 2009/0044949 A1 | 2/2009 | King et al. |
| 2009/0050334 A1 | 2/2009 | Marya et al. |
| 2009/0056934 A1 | 3/2009 | Xu |
| 2009/0065216 A1 | 3/2009 | Frazier |
| 2009/0084553 A1 | 4/2009 | Rytlewski et al. |
| 2009/0084556 A1 | 4/2009 | Richards et al. |
| 2009/0084600 A1 | 4/2009 | Severance |
| 2009/0090440 A1 | 4/2009 | Kellett |
| 2009/0107684 A1 | 4/2009 | Cooke, Jr. |
| 2009/0114381 A1 | 5/2009 | Stroobants |
| 2009/0114382 A1 | 5/2009 | Grove et al. |
| 2009/0145666 A1 | 6/2009 | Radford et al. |
| 2009/0151949 A1 | 6/2009 | Marya et al. |
| 2009/0152009 A1 | 6/2009 | Slay et al. |
| 2009/0155616 A1 | 6/2009 | Thamida |
| 2009/0159289 A1 | 6/2009 | Avant et al. |
| 2009/0178808 A1 | 7/2009 | Williamson et al. |
| 2009/0194273 A1 | 8/2009 | Surjaatmadja et al. |
| 2009/0205841 A1 | 8/2009 | Kluge et al. |
| 2009/0226340 A1 | 9/2009 | Marya |
| 2009/0226704 A1 | 9/2009 | Kauppinen et al. |
| 2009/0242202 A1 | 10/2009 | Rispler et al. |
| 2009/0242208 A1 | 10/2009 | Bolding |
| 2009/0242214 A1 | 10/2009 | Foster et al. |
| 2009/0255667 A1 | 10/2009 | Clem et al. |
| 2009/0255684 A1 | 10/2009 | Bolding |
| 2009/0255686 A1 | 10/2009 | Richard et al. |
| 2009/0260817 A1 | 10/2009 | Gambier et al. |
| 2009/0266548 A1 | 10/2009 | Olsen et al. |
| 2009/0272544 A1 | 11/2009 | Giroux et al. |
| 2009/0283270 A1 | 11/2009 | Langeslag |
| 2009/0293672 A1 | 12/2009 | Mirchandani et al. |
| 2009/0301730 A1 | 12/2009 | Gweily |
| 2009/0305131 A1 | 12/2009 | Kumar et al. |
| 2009/0308588 A1 | 12/2009 | Howell et al. |
| 2009/0317556 A1 | 12/2009 | Macary |
| 2010/0003536 A1 | 1/2010 | Smith et al. |
| 2010/0012385 A1 | 1/2010 | Drivdahl et al. |
| 2010/0015002 A1 | 1/2010 | Barrera et al. |
| 2010/0015469 A1 | 1/2010 | Romanowski |
| 2010/0025255 A1 | 2/2010 | Su et al. |
| 2010/0032151 A1 | 2/2010 | Duphorne |
| 2010/0040180 A1 | 2/2010 | Kim et al. |
| 2010/0044041 A1 | 2/2010 | Smith et al. |
| 2010/0051278 A1 | 3/2010 | Mytopher et al. |
| 2010/0055491 A1 | 3/2010 | Vecchio et al. |
| 2010/0055492 A1* | 3/2010 | Barsoum et al. ............ 428/613 |
| 2010/0089583 A1 | 4/2010 | Xu et al. |
| 2010/0089587 A1 | 4/2010 | Stout |
| 2010/0101803 A1 | 4/2010 | Clayton et al. |
| 2010/0122817 A1 | 5/2010 | Surjaatmadja et al. |
| 2010/0139930 A1 | 6/2010 | Patel et al. |
| 2010/0200230 A1 | 8/2010 | East, Jr. et al. |
| 2010/0236793 A1 | 9/2010 | Bjorgum |
| 2010/0236794 A1 | 9/2010 | Duan et al. |
| 2010/0243254 A1 | 9/2010 | Murphy et al. |
| 2010/0252273 A1 | 10/2010 | Duphorne |
| 2010/0252280 A1 | 10/2010 | Swor et al. |
| 2010/0270031 A1 | 10/2010 | Patel |
| 2010/0276136 A1 | 11/2010 | Evans et al. |
| 2010/0282338 A1 | 11/2010 | Gerrard et al. |
| 2010/0282469 A1 | 11/2010 | Richard et al. |
| 2010/0294510 A1 | 11/2010 | Holmes |
| 2010/0319870 A1 | 12/2010 | Bewlay et al. |
| 2011/0005773 A1 | 1/2011 | Dusterhoft et al. |
| 2011/0036592 A1 | 2/2011 | Fay |
| 2011/0048743 A1 | 3/2011 | Stafford et al. |
| 2011/0056692 A1 | 3/2011 | Lopez de Cardenas et al. |
| 2011/0056702 A1 | 3/2011 | Sharma et al. |
| 2011/0067872 A1 | 3/2011 | Agrawal |
| 2011/0067889 A1 | 3/2011 | Marya et al. |
| 2011/0067890 A1 | 3/2011 | Themig |
| 2011/0094406 A1 | 4/2011 | Marya et al. |
| 2011/0100643 A1 | 5/2011 | Themig et al. |
| 2011/0127044 A1 | 6/2011 | Radford et al. |
| 2011/0132143 A1 | 6/2011 | Xu et al. |
| 2011/0132612 A1 | 6/2011 | Agrawal et al. |
| 2011/0132619 A1 | 6/2011 | Agrawal et al. |
| 2011/0132620 A1 | 6/2011 | Agrawal et al. |
| 2011/0132621 A1 | 6/2011 | Agrawal et al. |
| 2011/0135530 A1 | 6/2011 | Xu et al. |
| 2011/0135805 A1 | 6/2011 | Doucet et al. |
| 2011/0135953 A1 | 6/2011 | Xu et al. |
| 2011/0136707 A1 | 6/2011 | Xu et al. |
| 2011/0139465 A1 | 6/2011 | Tibbles et al. |
| 2011/0147014 A1 | 6/2011 | Chen et al. |
| 2011/0186306 A1 | 8/2011 | Marya et al. |
| 2011/0214881 A1 | 9/2011 | Newton et al. |
| 2011/0247833 A1 | 10/2011 | Todd et al. |
| 2011/0253387 A1 | 10/2011 | Ervin |
| 2011/0259610 A1 | 10/2011 | Shkurti et al. |
| 2011/0277987 A1 | 11/2011 | Frazier |
| 2011/0277989 A1 | 11/2011 | Frazier |
| 2011/0284232 A1 | 11/2011 | Huang |
| 2011/0284240 A1 | 11/2011 | Chen et al. |
| 2011/0284243 A1 | 11/2011 | Frazier |
| 2011/0300403 A1 | 12/2011 | Vecchio et al. |
| 2012/0067426 A1 | 3/2012 | Soni et al. |
| 2012/0103135 A1* | 5/2012 | Xu et al. .................. 75/233 |
| 2012/0107590 A1 | 5/2012 | Xu et al. |
| 2012/0118583 A1 | 5/2012 | Johnson et al. |
| 2012/0130470 A1 | 5/2012 | Agnew et al. |
| 2012/0145389 A1 | 6/2012 | Fitzpatrick, Jr. |
| 2012/0168152 A1 | 7/2012 | Casciaro |
| 2012/0211239 A1 | 8/2012 | Kritzler et al. |
| 2012/0267101 A1 | 10/2012 | Cooke |
| 2012/0292053 A1 | 11/2012 | Xu et al. |
| 2012/0318513 A1 | 12/2012 | Mazyar et al. |
| 2013/0004847 A1 | 1/2013 | Kumar et al. |
| 2013/0025409 A1* | 1/2013 | Xu .................. 75/232 |
| 2013/0032357 A1 | 2/2013 | Mazyar et al. |
| 2013/0048304 A1 | 2/2013 | Agrawal et al. |
| 2013/0052472 A1* | 2/2013 | Xu .................. 428/548 |
| 2013/0081814 A1 | 4/2013 | Gaudette et al. |
| 2013/0105159 A1 | 5/2013 | Alvarez |
| 2013/0126190 A1 | 5/2013 | Mazyar et al. |
| 2013/0133897 A1 | 5/2013 | Baihly et al. |
| 2013/0146144 A1 | 6/2013 | Joseph et al. |
| 2013/0146302 A1 | 6/2013 | Gaudette et al. |
| 2013/0186626 A1 | 7/2013 | Aitken et al. |
| 2013/0240203 A1 | 9/2013 | Frazier |
| 2013/0327540 A1 | 12/2013 | Hamid et al. |
| 2014/0116711 A1 | 5/2014 | Tang et al. |

FOREIGN PATENT DOCUMENTS

| | | |
|---|---|---|
| CN | 1076968 A | 10/1993 |
| CN | 1255879 A | 6/2000 |
| CN | 101050417 A | 10/2007 |
| CN | 101351523 A | 1/2009 |
| CN | 101457321 A | 6/2010 |
| EP | 0033625 A1 | 8/1981 |
| EP | 1798301 A1 | 8/2006 |
| EP | 1857570 A2 | 11/2007 |
| GB | 912956 | 12/1962 |
| JP | 61-67770 A | 4/1986 |
| JP | 61067770 | 4/1986 |
| JP | 07-54008 A | 2/1995 |
| JP | 08-232029 A | 9/1996 |
| JP | 2000185725 A1 | 7/2000 |
| JP | 2004225084 | 8/2004 |
| JP | 2004225084 A | 8/2004 |
| JP | 2004225765 A | 8/2004 |
| JP | 2005076052 A | 3/2005 |
| JP | 2010-502840 A | 1/2010 |
| KR | 95-0014350 B1 | 11/1995 |
| WO | 9947726 | 9/1999 |

(56) References Cited

FOREIGN PATENT DOCUMENTS

| | | | |
|---|---|---|---|
| WO | 2008034042 A3 | 3/2008 | |
| WO | 2008057045 A1 | 5/2008 | |
| WO | 2008079485 A2 | 7/2008 | |
| WO | 2008079777 A3 | 7/2008 | |
| WO | WO2008079485 | 7/2008 | |
| WO | 2009079745 A1 | 7/2009 | |
| WO | 2011071902 A2 | 6/2011 | |
| WO | 2011071910 A2 | 6/2011 | |
| WO | 2012174101 A2 | 12/2012 | |
| WO | 2013053057 A1 | 4/2013 | |
| WO | 2013078031 A1 | 5/2013 | |

OTHER PUBLICATIONS

Ambat, et al.; "Electroless Nickel-Plating on AZ91D Magnesium Alloy: Effect of Substrate Microstructure and Plating Parameters"; Surface and Coatings Technology; 179; pp. 124-134; (2004).
Baker Hughes Tools. "Baker Oil Tools Introduces Revolutionary Sand Control Completion Technology," May 2, 2005.
E. Paul Bercegeay et al., "A One-Trip Gravel Packing System"; Society of Petroleum Engineers, Offshore Technology Conference, SPE Paper No. 4771; Feb. 7-8, 1974.
Bybee, Karen. "One-Trip Completion System Eliminates Perforations," Completions Today, Sep. 2007, pp. 52-53.
CH. Christoglou, N. Voudouris, G.N. Angelopoulos, M. Pant, W. Dahl, "Deposition of Aluminum on Magnesium by a CVD Process", Surface and Coatings Technology 184 (2004) 149-155.
Chang, et al.; "Electrodeposition of Aluminum on Magnesium Alloy in Aluminum Chloride (A1C13)-1-ethy1-3-methylimidazolium chloride (EMIC) Ionic Liquid and Its Corrosion Behavior"; Electrochemistry Communications; 9; pp. 1602-1606; (2007).
Chun-Lin, Li. "Design of Abrasive Water Jet Perforation and Hydraulic Fracturing Tool," Oil Field Equipment, Mar. 2011.
Marek Galanty et al. "Consolidation of metal powders during the extrusion process", Journal of Materials Processing Techology, 125-126 (2002) 491-496.
Constantin Vahlas, Bri Gitte Caussat, Philippe Serp, George N. Angelopoulos, "Principles and Applications of CVD Powder Technology", Materials Science and Engineering R 53 (2006) 1-72.
Curtin, William and Brian Sheldon. "CNT-reinforced ceramics and metals," Materials Today, 2004, Vol-7, 44-49.
Yi Feng, Hailong Yuan, "Electroless Plating of Carbon Nanotubes with Silver" Journal of Materials Science, 39, (2004) pp. 3241-3243.
E. Flahaut et al., "Carbon Nanotube-Metal-Oxide Nanocomposites: Microstructure, Electrical Conductivity and Mechanical Properties" Acta Materiala 48 (2000) 3803-3812.
Forsyth, et al.; "An Ionic Liquid Surface Treatment for Corrosion Protection of Magnesium Alloy AZ31"; Electrochem. Solid-State Lett./ 9(11); B52-B55 (2006).
Forsyth, et al.; "Exploring Corrosion Protection of Mg Via Ionic Liquid Pretreatment"; Surface & Coatings Technology; 201; pp. 4496-4504; (2007).
Galanty et al. "Consolidation of metal powders during the extrusion process," Journal of Materials Processing Technology (2002), pp. 491-496.
C. S. Goh, J. Wei, L C Lee, and M. Gupta, "Development of novel carbon nanotube reinforced magnesium nanocomposites using the powder metallurgy technique", Nanotechnology 17 (2006) 7-12.
Guan Ling Song, Andrej Atrens "Corrosion Mechanisms of Magnesium Alloys", Advanced Engineering Materials 1999, 1, No. 1, pp. 11-33.
H. Hermawan, H. Alamdari, D. Mantovani and Dominique Dube, "Iron-manganese: new class of metallic degradable biomaterials prepared by powder metallurgy", Powder Metallurgy, vol. 51, No. 1, (2008), pps. 38-45.
Hjortstam et al. "Can we achieve ultra-low resistivity in carbon nanotube-based metal composites," Applied Physics A (2004), vol. 78, Issue 8, pp. 1175-1179.

Hsiao et al.; "Effect of Heat Treatment on Anodization and Electrochemical Behavior of AZ91D Magnesium Alloy"; J. Mater. Res.; 20(10); pp. 2763-2771;(2005).
Hsiao, et al.; "Anodization of AZ91D Magnesium Alloy in Silicate-Containing Electrolytes"; Surface & Coatings Technology; 199; pp. 127-134; (2005).
Hsiao, et al.; "Baking Treatment Effect on Materials Characteristics and Electrochemical Behavior of anodic Film Formed on AZ91D Magnesium Alloy"; Corrosion Science; 49; pp. 781-793; (2007).
Hsiao, et al.; "Characterization of Anodic Films Formed on AZ91D Magnesium Alloy"; Surface & Coatings Technology; 190; pp. 299-308; (2005).
Huo et al.; "Corrosion of AZ91D Magnesium Alloy with a Chemical Conversion Coating and Electroless Nickel Layer"; Corrosion Science: 46; pp. 1467-1477; (2004).
J. Dutta Majumdar, B. Ramesh Chandra, B.L. Mordike, R. Galun, I. Manna, "Laser Surface Engineering of a Magnesium Alloy with Al + Al2O3", Surface and Coatings Technology 179 (2004) 297-305.
J.E. Gray, B. Luan, "Protective Coatings on Magnesium and Its Alloys—a Critical Review", Journal of Alloys and Compounds 336 (2002) 88-113.
Toru Kuzumaki, Osamu Ujiie, Hideki Ichinose, and Kunio Ito, "Mechanical Characteristics and Preparation of Carbon Nanotube Fiber-Reinforced Ti Composite", Advanced Engineering Materials, 2000, 2, No. 7.
Liu, et al.; "Electroless Nickel Plating on AZ91 Mg Alloy Substrate"; Surface & Coatings Technology; 200; pp. 5087-5093; (2006).
Lunder et al.; "The Role of Mg17Al12 Phase in the Corrosion of Mg Alloy AZ91"; Corrosion; 45(9); pp. 741-748; (1989).
Stephen P. Mathis, "Sand Management: A Review of Approaches and Concerns"; Society of Petroleum Engineers, SPE Paper No. 82240; SPE European Formation Damage Conference, The Hague, The Netherlands, May 13-14, 2003.
Xiaowu Nie, Patents of Methods to Prepare Intermetallic Matrix Composites: A Review, Recent Patents on Materials Science 2008, 1, 232-240, Department of Scientific Research, Hunan Railway College of Science and Technology, Zhuzhou, P.R. China.
Pardo, et al.; "Corrosion Behaviour of Magnesium/Aluminium Alloys in 3.5 wt% NaCl"; Corrosion Science; 50; pp. 823-834; (2008).
Shi et al.; "Influence of the Beta Phase on the Corrosion Performance of Anodised Coatings on Magnesium—Aluminium Alloys"; Corrosion Science; 47; pp. 2760-2777; (2005).
Song, et al.; "Corrosion Mechanisms of Magnesium Alloys"; Advanced Engineering Materials; 1(1); pp. 11-33; (1999).
Song, G. and S. Song. "A Possible Biodegradable Magnesium Implant Material," Advanced Engineering Materials, vol. 9, Issue 4, Apr. 2007, pp. 298-302.
Song, Guangling; "Recent Progress in Corrosion and Protection of Magnesium Alloys"; Advanced Engineering Materials; 7(7); pp. 563-586; (2005).
Song, et al.; "Influence of Microstructure on the Corrosion of Diecast AZ91D"; Corrosion Science; 41; pp. 249-273; (1999).
Song, et al.; "Corrosion Behaviour of AZ21, AZ501 and AZ91 in Sodium Chloride"; Corrosion Science; 40(10); pp. 1769-1791; (1998).
Song, et al.; "Understanding Magnesium Corrosion"; Advanced Engineering Materials; 5; No. 12; pp. 837-858; (2003).
Jing Sun, Lian Gao, Wei Li, "Colloidal Processing of Carbon Nanotube/Alumina Composites" Chem. Mater. 2002, 14, 5169-5172.
Xiaotong Wang et al., "Contact-Damage-Resistant Ceramic/Single-Wall Carbon Nanotubes and Ceramic/Graphite Composites" Nature Materials, vol. 3, Aug. 2004, pp. 539-544.
Y. Zhang and Hongjie Dai, "Formation of metal nanowires on suspended single-walled carbon nanotubes" Applied Physics Letter, vol. 77, No. 19 (2000), pp. 3015-3017.
Yihua Zhu, Chunzhong Li, Qiufang Wu, "The process of coating on ultrafine particles by surface hydrolysis reaction in a fluidized bed reactor", Surface and Coatings Technology 135 (2000) 14-17.
Zeng et al. "Progress and Challenge for Magnesium Alloys as Biomaterials," Advanced Engineering Materials, vol. 10, Issue 8, Aug. 2008, pp. B3-B14.

(56) References Cited

OTHER PUBLICATIONS

Guo-Dong Zhan, Joshua D. Kuntz, Julin Wan and Amiya K. Mukherjee, "Single-wall carbon nanotubes as attractive toughening agents in alumina-based nanocomposites" Nature Materials, vol. 2., Jan. 2003. 38-42.

Zhang, et al; "Study on the Environmentally Friendly Anodizing of AZ91D Magnesium Alloy"; Surface and Coatings Technology: 161; pp. 36-43; (2002).

Y. Zhang, Nathan W. Franklin, Robert J. Chen, Hongjie Dai, "Metal Coating on Suspended Carbon Nanotubes and its Implication to Metal—Tube Interaction", Chemical Physics Letters 331 (2000) 35-41.

J. Constantine, "Selective Production of Horizontal Openhole Completions Using ECP and Sliding Sleeve Technology." SPE Rocky Mountain Regional Meeting, May 15-18, 1999, Gillette, Wyoming. [Abstract Only].

Flow Control Systems, [online]; [retrieved on May 20, 2010]; retrieved from the Internet http://www.bakerhughes.com/products-and-services/completions-and-productions/well-completions/packers-and-flow-control/flow-control-systems.

H. Watarai, "Trend of research and development for magnesium alloys—reducing the weight of structural materials in motor vehicles", (2006) Science and Technology Trends, Quarterly Review No. 18, 84-97.

ISR and Written Opinion of PCT/US2012/038622; Mailed Dec. 6, 2012.

ISR and Written Opinion of PCT/US2010/059259; Mailed Jun. 13, 2011.

ISR and Written Opinion of PCT/US2010/059257; Jul. 27, 2011.

ISR and Written Opinion of PCT/US2011/043036, mailed Feb. 23, 2012.

ISR and Written Opinion of PCT/US2010/059265; Mailed Jun. 16, 2011.

ISR and Written Opinion of PCT/US2010/059268; Mailed Jun. 17, 2011.

ISR and Written Opinion of PCT/US2011/058099, mailed on May 11, 2012.

ISR and Written Opinion of PCT/US2011/058105 mailed on May 1, 2012.

ISR and Written Opinion of PCT/US2012/034978, mailed on Nov. 12, 2012.

ISR and Written Opinion of PCT/US2012/044866, dated Jan. 2, 2013.

ISR and Written Opinion of PCT/US2012/046231, Mailed Jan. 29, 2013.

ISR and Written Opinion of PCT/US2012/049434, Mailed Feb. 1, 2013.

ISR and Written Opinion of PCT/US2010/057763; mailed Jul. 28, 2011.

ISR and Written Opinion of PCT/US2011/047000; Mailed Dec. 26, 2011.

M. Bououdina, et al., "Comparative study of mechanical alloying of (Mg+Al) and (Mg+Al+Ni) mixtures for hydrogen storage", Journal of Alloys and Compounds, 2002, 336, 222-231.

M. Liu, et al., "Calculated phase diagrams and the corrosion of die-cast Mg—Al alloys", Corrosion Science, 2009, 51, 606-619.

Optisleeve Sliding Sleeve, [online]; [retrieved on Jun. 25, 2010]; retrieved from the Internet weatherford.com/weatherford/groups/.../weatherfordcorp/WFT033159.pdf.

ISR and Written Opinion of PCT/US2012/034973, mailed on Nov. 29, 2012.

S.L. Lee et al., "Effects of Ni addition on hydrogen storage properties of Mg17AL12 alloy", Materials Chemistry and Physics, 2011, 126, 319-324.

Shumbera et al., "Improved Water Injector Performance in a Gulf of Mexico Deepwater Development Using an Openhole Frac Pack Completion and Downhole Filter System: Case History." SPE Annual Technical Conference and Exhibition, Oct. 5-8, 2003, Denver, Colorado. [Abstract Only].

"Sliding Sleeve", Omega Completion Technology Ltd, Sep. 29, 2009, retrieved on: www.omega-completion.com.

T. Bastow, et al., "Clustering and formation of nano-precipitates in dilute aluminum and magnesium alloys", Materials Science and Engineering, 2003, C23, 757-762.

H. Vickery, et al., "New One-Trip Multi-Zone Frac Pack System with Positive Positioning." European Petroleum Conference, Oct. 29-31, 2002, Aberdeen, UK. [Abstract Only].

W. Welch et al., "Nonelastomeric Sliding Sleeve Maintains Long Term Integrity in HP/HT Application: Case Histories" [Abstract Only], SPE Eastern Regional Meeting, Oct. 23-25, 1996, Columbus. Ohio.

X. Nie, "Patents of Methods to Prepare Intermetallic Matrix Composites": A Review, Recent Patents on Materials Science 2008, 1, 232-240, Department of Scientific Research, Hunan Railway College of Science and Technology, Zhuzhou, P.R. China.

Baker Oil Tools. "Z-Seal Metal-to-Metal Expandable Sealing Device Uses Expanding Metal in Place of Elastomers," Nov. 6, 2006.

ISR and Written Opinion for PCT/US2010/059263, mailed Jul. 8, 2011.

A. Seyni et al., "On the interest of using degradable fillers in co-ground composite materials", Powder Technology 190, (2009) pp. 176-184.

Ambat, et al., "Electroless Nickel-Plating on AZ91D Magnesium Alloy: Effect of Substrate Microstructure and Plating Parameters"; Surface and Coatings Technology; 179, pp. 124-134, (2004).

Baker Hughes, "Baker Oil Tools Introduces Revolutionary Sand Control Completion Technology," May 2, 2005.

E. Bercegeay et al., "A One-Trip Gravel Packing System"; Society of Petroleum Engineers, Offshore Technology Conference, SPE Paper No. 4771; Feb. 7-8, 1974.

K. Bybee, "One-Trip Completion System Eliminates Perforations," Completions Today, Sep. 2007, pp. 52-53.

CH. Christoglou, et al., "Deposition of Aluminum on Magnesium by a CVD Process", Surface and Coatings Technology 184 (2004) 149-155.

Chang, et al., "Electrodeposition of Aluminum on Magnesium Alloy in Aluminum Chloride (A1C13)-1-ethyl-3-methylimidazolium chloride (EMIC) Ionic Liquid and Its Corrosion Behavior"; Electrochemistry Communications; 9; pp. 1602-1606; (2007).

Li Chun-Lin, "Design of Abrasive Water Jet Perforation and Hydraulic Fracturing Tool," Oil Field Equipment, Mar. 2011. [Abstract Only].

M. Galanty et al., "Consolidation of metal powders during the extrusion process", Journal of Materials Processing Techology, 125-126 (2002) 491-496.

C. Vahlas, et al., "Principles and Applications of CVD Powder Technology", Materials Science and Engineering R 53 (2006) 1-72.

W. Curtin et al., "CNT-reinforced ceramics and metals," Materials Today, 2004, Vol-7, 44-49.

E. Ayman, et al., "Effect of Consolidation and Extrusion Temperatures on Tensile Properties of Hot Extruded ZK61 Magnesium Alloy Gas Atomized Powders via Spark Plasma Sintering" Transactions of JWRI, vol. 38, (2009) No. 2, pp. 31-35.

Y. Feng, et al., "Electroless Plating of Carbon Nanotubes with Silver" Journal of Materials Science, 39, (2004) pp. 3241-3243.

E. Flahaut et al., "Carbon Nanotube-Metal-Oxide Nanocomposites: Microstructure, Electrical Conductivity and Mechanical Properties" Acta mater. 48 (2000) 3803-3812.

M. Forsyth, et al., "An Ionic Liquid Surface Treatment for Corrosion Protection of Magnesium Alloy AZ31"; Electrochem. Solid-State Lett./ 9(11); B52-B55 (2006).

N. Birbilis, et al.; "Exploring Corrosion Protection of Mg Via Ionic Liquid Pretreatment"; Surface & Coatings Technology; 201; pp. 4496-4504; (2007).

C. Goh., "Development of novel carbon nanotube reinforced magnesium nanocomposites using the powder metallurgy technique", Nanotechnology 17 (2006) 7-12.

G. Song et al., "Corrosion Mechanisms of Magnesium Alloys", Advanced Engineering Materials 1999, 1, No. 1, pp. 11-33.

H. Hermawan, et al., "Iron-manganese: new class of metallic degradable biomaterials prepared by powder metallurgy", Powder Metallurgy, vol. 51, No. 1, (2008) pp. 38-45.

(56) References Cited

OTHER PUBLICATIONS

B. Han., "Mechanical Properties of Nanostructured Materials", Rev. Adv. Mater. Sci. 9(2005) 1-16.
O. Hjortstam et al., "Can we achieve ultra-low resistivity in carbon nanotube-based metal composites," Applied Physics A (2004), vol. 78, Issue 8, pp. 1175-1179.
H-Y. Hsiao et al., "Effect of Heat Treatment on Anodization and Electrochemical Behavior of AZ91D Magnesium Alloy", J. Mater. Res., vol. 20, No. 10, pp. 2763-2771, (2005).
H-Y. Hsiao, et al., "Anodization of AZ91D Magnesium Alloy in Silicate-Containing Electrolytes", Surface & Coatings Technology, 199, pp. 127-134, (2005).
H-Y. Hsiao, et al., "Baking Treatment Effect on Materials Characteristics and Electrochemical Behavior of anodic Film Formed on AZ91D Magnesium Alloy", Corrosion Science, 49, pp. 781-793, (2007).
H-Y. Hsiao, et al., "Characterization of Anodic Films Formed on AZ91D Magnesium Alloy", Surface & Coatings Technology, 190, pp. 299-308, (2005).
H. Huo et al., "Corrosion of AZ91D Magnesium Alloy with a Chemical Conversion Coating and Electroless Nickel Layer", Corrosion Science: 46, pp. 1467-1477, (2004).
J. Majumdar et al., "Laser Surface Engineering of a Magnesium Alloy with Al + Al2O3", Surface and Coatings Technology 179 (2004) 297-305.
J. Gray, et al., "Protective Coatings on Magnesium and Its Alloys—a Critical Review", Journal of Alloys and Compounds 336 (2002) 88-113.
T. Kuzumaki, et al., "Mechanical Characteristics and Preparation of Carbon Nanotube Fiber-Reinforced Ti Composite", Advanced Engineering Materials, 2000, 2, No. 7.
Z, Liu, et al "Electroless Nickel Plating on AZ91 Mg Alloy Substrate"; Surface & Coatings Technology, 200; pp. 5087-5093, (2006).
O. Lunder et al., "The Role of Mg17Al12 Phase in the Corrosion of Mg Alloy AZ91", Corrosion, 45(9); pp. 741-748, (1989).
S. Mathis, "Sand Management: A Review of Approaches and Concerns", Society of Petroleum Engineers, SPE Paper No. 82240; SPE European Formation Damage Conference, The Hague, The Netherlands, May 13-14, 2003.
E. Lavernia et al., "Cryomilled nanostructured materials: Processing and properties", Materials Science and Engineering A, 493, (2008) 207-214.
Y. Li, et al., "Investigation of aluminum-based nanocomposites with ultra-high strength", Materials Science and Engineering A, 527 (2009) 305-316.
A. Pardo, et al., "Corrosion Behaviour of Magnesium/Aluminium Alloys in 3.5 wt% NaCl"; Corrosion Science, 50; pp. 823-834; (2008).
Z. Shi et al.; "Influence of the Beta Phase on the Corrosion Performance of Anodised Coatings on Magnesium—Aluminium Alloys", Corrosion Science; 47; pp. 2760-2777, (2005).
Y. Shimizu et al., "Multi-walled carbon nanotube-reinforced magnesium alloy composites", Scripta Materialia, vol. 58, Issue 4, pp. 267-279 (2008).
G. Song, et al., "A Possible Biodegradable Magnesium Implant Material," Advanced Engineering Materials, vol. 9, Issue 4, Apr. 2007, pp. 298-302. [Abstract].
G. Song, "Recent Progress in Corrosion and Protection of Magnesium Alloys", Advanced Engineering Materials; 7(7); pp. 563-586; (2005).
G. Song, et al., "Influence of Microstructure on the Corrosion of Diecast AZ91D", Corrosion Science; 41; pp. 249-273; (1999).
G. Song, et al., "Corrosion Behaviour of AZ21, AZ501 and AZ91 in Sodium Chloride", Corrosion Science; 40(10); pp. 1769-1791; (1998).
G. Song, et al., "Understanding Magnesium Corrosion—A Framework for Improved Alloy Performance"; Advanced Engineering Materials; 5; No. 12; pp. 837-858; (2003).
J. Sun, "Colloidal Processing of Carbon Nanotube/Alumina Composites", Chem. Mater. 2002, 14, 5169-5172.

X. Wang et al., "Contact-Damage-Resistant Ceramic/Single-Wall Carbon Nanotubes and Ceramic/Graphite Composites", Nature Materials, vol. 3, Aug. 2004, pp. 539-544.
H. Watanabe, et al., "Superplastic Deformation Mechanism in Powder Metallurgy Magnesium Alloys and Composites", Acta mater. 49 (2001) pp. 2027-2037.
Y. Zhang., "Formation of metal nanowires on suspended single-walled carbon nanotubes", Applied Physics Letter, vol. 77, No. 19 (2000), pp. 3015-3017.
Y. Zhu, et al., "The process of coating on ultrafine particles by surface hydrolysis reaction in a fluidized bed reactor", Surface and Coatings Technology 135 (2000) 14-17.
G-D Zhan, et al., "Single-wall carbon nanotubes as attractive toughening agents in alumina-based nanocomposites" Nature Materials, vol. 2., Jan. 2003. 38-42.
A. Maisano., "Cryomilling of Aluminum-Based and Magnesium-Based Metal Powders", Thesis, Virginia Tech, Jan. 13, 2006.
Elsayed Ayman, Imai Hisashi, Umeda Junko and Kondoh Katsuyoshi, "Effect of Consolidation and Extrusion Temperatures on Tensile Properties of Hot Extruded ZK61 Magnesium Alloy Gas Atomized Powders via Spark Plasma Sintering" Transacation of JWRI, vol. 38, (2009) No. 2, pp. 31-35.
Bing Q. Han, Enrique J. Lavernia and Farghalli A. Mohamed, "Mechanical Properties of Nanostructured Materials", Rev. Adv. Mater. Sci. 9(2005) 1-16.
Adam J. Maisano, "Cryomilling of Aluminum-Based and Magnesium-Based Metal Powders", Thesis, Virginia Tech, Jan. 13, 2006.
E.J. Lavenia, B.Q. Han, J.M. Schoenung: "Cryomilled nanostructured materials: Processing and properties", Materials Science and Engineering A, 493, (2008) 207-214.
Y. Li, Y.H. Zhao, V. Ortalan, W. Liu, Z.H. Zhang, R.G. Vogt, N.D. Browning, E.J. Lavernia, J.M. Schoenung: "Investigation of aluminum-based nanocomposites with ultra-high strength", Materials Science and Engineering A, 527 (2009) 305-316.
H. Watanabe, T. Mukai, M. Mabuchi and K. Higashi, "Superplastic Deformation Mechanism in Powder Metallurgy Magnesium Alloys and Composites", Acta mater. 49 (2001) pp. 2027-2037.
Garfield G., Baker Hughes Incoporated, New One-Trip Sand-Control Completion System that Eliminates Formation Damage Resulting From conventional Perforating and Gravel-Packing Operations:, SPE Annual Technical Conference and Exhibition, Oct. 9-12, 2005.
Garfield, Garry, McElfresh, P., Williams C. and Baker Hughes Incorporated, "Maximizing Inflow Performance in Soft Sand Completions Using New One-trip Sand Control Liner Completion Technology", SPE European Formation Damage Conference, May 25-27, 2005, SP.
Joel Shaw, "Benefits and Application of a Surface-Controlled Sliding Sleeve for Fracturing Operations"; Society of Petroleum Engineers, SPE Paper No. 147546; Oct. 30, 2011; 8 pages.
N. Birbilis, et al., "Exploring Corrosion Protection of Mg Via Ionic Liquid Pretreatment", Surface & Coatings Technology; 201, pp. 4496-4504, (2007).
N. Carrejo et al., "Improving Flow Assurance in Multi-Zone Fracturing Treatments in Hydrocarben Reservoirs with High Strength Corrodible Tripping Balls"; Society of Petroleum Engineers; SPE Paper No. 151613; Apr. 16, 2012; 6 pages.
Wikipedia, the free encyclopedia. Reactivity series. http://en.wikipedia.org/w/index.php?title=Reactivity_series&printable=yes downloaded on May 18, 2014. 8 pages.
Adams, et al.; "Thermal stabilities of aromatic acids as geothermal tracers", Geothermics, vol. 21, No. 3, 1992, pp. 323-339.
Ayman, et al.; "Effect of Consolidation and Extrusion Temperatures on Tensile Properties of Hot Extruded ZK61 Magnesium Alloy Gas Atomized Powders via Spark Plasma Sintering", Transactions of JWRI, vol. 38 (2009), No. 2, pp. 1-5.
Baker Hughes Incorporated. IN-Tallic Disintegrating Frac Balls. Houston: Baker Hughes Incorporated, 2011. Accessed Mar. 6, 2015.
Baker Hughes, "Multistage", Oct. 31, 2011, BakerHughes.com; accessed Mar. 6, 2015.
International Search Report and Written Opinion; International Application No. PCT/US2012/053339; International Filing Date: Aug. 31, 2012; Date of Mailing: Feb. 15, 2013; 11 pages.

(56) References Cited

OTHER PUBLICATIONS

International Search Report and Written Opinion; International Application No. PCT/US2012/053342; International Filing Date: Aug. 31, 2012; Date of Mailing: Feb. 19, 2013; 9 pages.
International Search Report and Written Opinion; International Application No. PCT/US2012/053350; International Filing Date: Aug. 31, 2012; Date of Mailing: Feb. 25, 2013; 10 pages.
International Search Report and Written Opinion; International Application No. PCT/US2012/071742; International Filing Date: Dec. 27, 2012; Date of Mailing: Apr. 22, 2013; 12 pages.
International Search Report and Written Opinion; International Application No. PCT/US2014/049347; International Filing Date: Aug. 1, 2014; Date of Mailing: Nov. 24, 2014; 11 pages.
International Search Report and Written Opinion; International Application No. PCT/US2014/054720; International Filing Date: Sep. 9, 2014; Date of Mailing: Dec. 17, 2014; 10 pages.
International Search Report and Written Opinion; International Application No. PCT/US2014/058997, International Filing Date: Oct. 3, 2014; Date of Mailing: Jan. 12, 2015; 12 pages.
International Search Report; International Application No. PCT/US2012/044229, International Filing Date: Jun. 26, 2012; Date of Mailing; Jan. 30, 2013; 3 pages.
Murray, "Binary Alloy Phase Diagrams" Int. Met. Rev., 30(5) 1985 vol. 1, pp. 103-187.
Rose, et al.; "The application of the polyaromatic sulfonates as tracers in geothermal reservoirs", Geothermics 30 (2001) pp. 617-640.
Shigematsu, et al., "Surface Treatment of AZ91D Magnesium Alloy by Aluminum diffusion Coating", Journal of Materials Science Letters 19, 2000, pp. 473-475.
Singh, et al., "Extended Homogeneity Range of Intermetallic Phases in Mechanically Alloyed Mg-Al Alloys", Elsevier Sciences Ltd., Intemetallics 11, 2003, pp. 373-376.
Stanley, et al.; "An Introduction to Ground-Water Tracers", Department of Hydrology and Water Resources, University of Arizona, Mar. 1985, pp. 1-219.
Vernon Constien et al., "Development of Reactive Coatings to Protect Sand-Control Screens", SPE 112494, Copyright 2008, Society of Petroleum Engineers, Presented at the 2008 SPE International Symposium and Exhibition on Formation Damage Control.
Walters, et al.; "A Study of Jets from Unsintered-Powder Metal Lined Nonprecision Small-Caliber Shaped Charges", Army Research Laboratory, Aberdeen Proving Ground, MD 21005-5066; Feb. 2001.
Xu, et al., "Nanostructured Material-Based Completion Tools Enhance Well Productivity"; International Petroleum Technology Conference; Conference Paper IPTC 16538; International Petroleum Technology Conference 2013; 4 pages.
Zemel, "Tracers in the Oil Field", University of Texas at Austin, Center for Petroleum and Geosystems, Jan. 1995, Chapters 1, 2, 3, 7.
Zhang, et al.; "High Strength Nanostructured Materials and Their Oil Field Applications"; Society of Petroleum Engineers; Conference Paper SPE 157092; SPE International Oilfield Nanotechnology Conference, 2012; 6 pages.

\* cited by examiner

ALUMINUM ALLOY POWDER METAL COMPACT

BACKGROUND

Oil and natural gas wells often utilize wellbore components or tools that, due to their function, are only required to have limited service lives that are considerably less than the service life of the well. After a component or tool service function is complete, it must be removed or disposed of in order to recover the original size of the fluid pathway for use, including hydrocarbon production, $CO_2$ sequestration, etc. Disposal of components or tools has conventionally been done by milling or drilling the component or tool out of the wellbore, which are generally time consuming and expensive operations.

In order to eliminate the need for milling or drilling operations, the removal of components or tools from the wellbore by dissolution or corrosion using various dissolvable or corrodible materials has been proposed. While these materials are useful, it is also very desirable that these materials be lightweight and have high strength, including a strength comparable to that of conventional engineering materials used to form wellbore components or tools, such as various grades of steel. Thus, the further improvement of dissolvable or corrodible materials to increase their strength, corrodibility and manufacturability is very desirable.

SUMMARY

In an exemplary embodiment, a powder metal compact is disclosed. The powder metal compact includes a cellular nanomatrix comprising a nanomatrix material. The powder metal compact also includes a plurality of dispersed particles comprising a particle core material that comprises an Al—Cu—Mg, Al—Mn, Al—Si, Al—Mg, Al—Mg—Si, Al—Zn, Al—Zn—Cu, Al—Zn—Mg, Al—Zn—Cr, Al—Zn—Zr, or Al—Sn—Li alloy, or a combination thereof, dispersed in the cellular nanomatrix.

BRIEF DESCRIPTION OF THE DRAWINGS

Referring now to the drawings wherein like elements are numbered alike in the several Figures.

DETAILED DESCRIPTION

Figure 1:
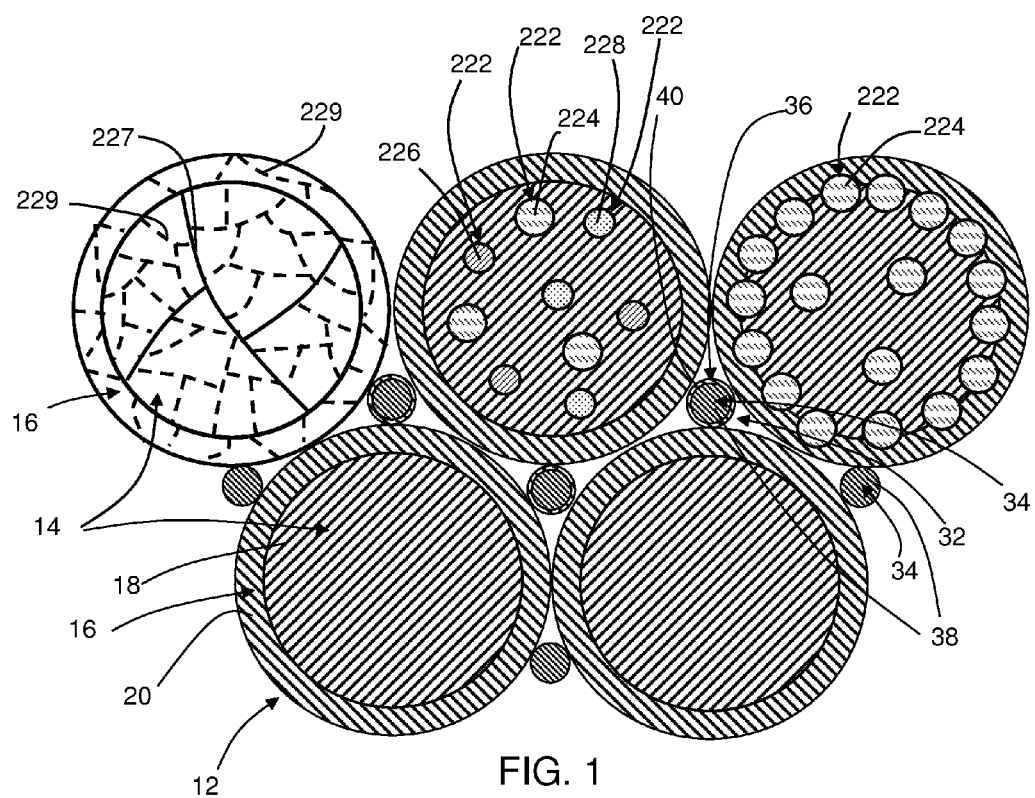
FIG. 1 is a schematic illustration of an exemplary embodiment of a powder 10 and powder particles 12.

Lightweight, high-strength aluminum alloy nanomatrix materials are disclosed. The aluminum alloys used to form these nanomatrix materials are high-strength aluminum alloys. Their strength may be enhanced through the incorporation of nanostructuring into the alloys. The strength of these alloys may also be improved by the incorporation of various strengthening subparticles and second particles. The aluminum alloy nanomatrix materials disclosed may also incorporate various microstructural features to control the alloy mechanical properties, such as the incorporation of a substantially elongated particle microstructure to enhance the alloy strength, or a multi-modal particle size in the alloy microstructural to enhance the fracture toughness, or a combination thereof to control both the strength, fracture toughness and other alloy properties.

The aluminum alloy nanomatrix materials disclosed herein may be used in all manner of applications and application environments, including use in various wellbore environments, to make various lightweight, high-strength articles, including downhole articles, particularly tools or other downhole components. In addition to their lightweight, high strength characteristics, these nanomatrix materials may be described as controlled electrolytic materials, which may be selectably and controllably disposable, degradable, dissolvable, corrodible or otherwise removable from the wellbore. Many other applications for use in both durable and disposable or degradable articles are possible. In one embodiment these lightweight, high-strength and selectably and controllably degradable materials include fully-dense, sintered powder compacts formed from coated powder materials that include various lightweight particle cores and core materials having various single layer and multilayer nanoscale coatings. In another embodiment, these materials include selectably and controllably degradable materials may include powder compacts that are not fully-dense or not sintered, or a combination thereof, formed from these coated powder materials.

Nanomatrix materials and methods of making these materials are described generally, for example, in U.S. patent application Ser. No. 12/633,682 filed on Dec. 8, 2009 and U.S. patent application Ser. No. 13/194,361 filed on Jul. 29, 2011, which are hereby incorporated herein by reference in their entirety. These lightweight, high-strength and selectably and controllably degradable materials may range from fully-dense, sintered powder compacts to precursor or green state (less than fully dense) compacts that may be sintered or unsintered. They are formed from coated powder materials that include various lightweight particle cores and core materials having various single layer and multilayer nanoscale coatings. These powder compacts are made from coated metallic powders that include various electrochemically-active (e.g., having relatively higher standard oxidation potentials) lightweight, high-strength particle cores and core materials, such as electrochemically active metals, that are dispersed within a cellular nanomatrix formed from the consolidation of the various nanoscale metallic coating layers of metallic coating materials, and are particularly useful in wellbore applications. The powder compacts may be made by any suitable powder compaction method, including cold isostatic pressing (CIP), hot isostatic pressing (HIP), dynamic forging and extrusion, and combinations thereof. These powder compacts provide a unique and advantageous combination of mechanical strength properties, such as compression and shear strength, low density and selectable and controllable corrosion properties, particularly rapid and controlled dissolution in various wellbore fluids. The fluids may include any number of ionic fluids or highly polar fluids, such as those that contain various chlorides. Examples include fluids comprising potassium chloride (KCl), hydrochloric acid (HCl), calcium chloride (CaCl$_2$), calcium bromide (CaBr$_2$) or zinc bromide (ZnBr$_2$). The disclosure of the '682 and '361 applications regarding the nature of the coated powders and methods of making and compacting the coated powders are generally applicable to provide the lightweight, high-strength aluminum alloy nanomatrix materials disclosed herein, and for brevity, are not repeated herein.

Figure 2:
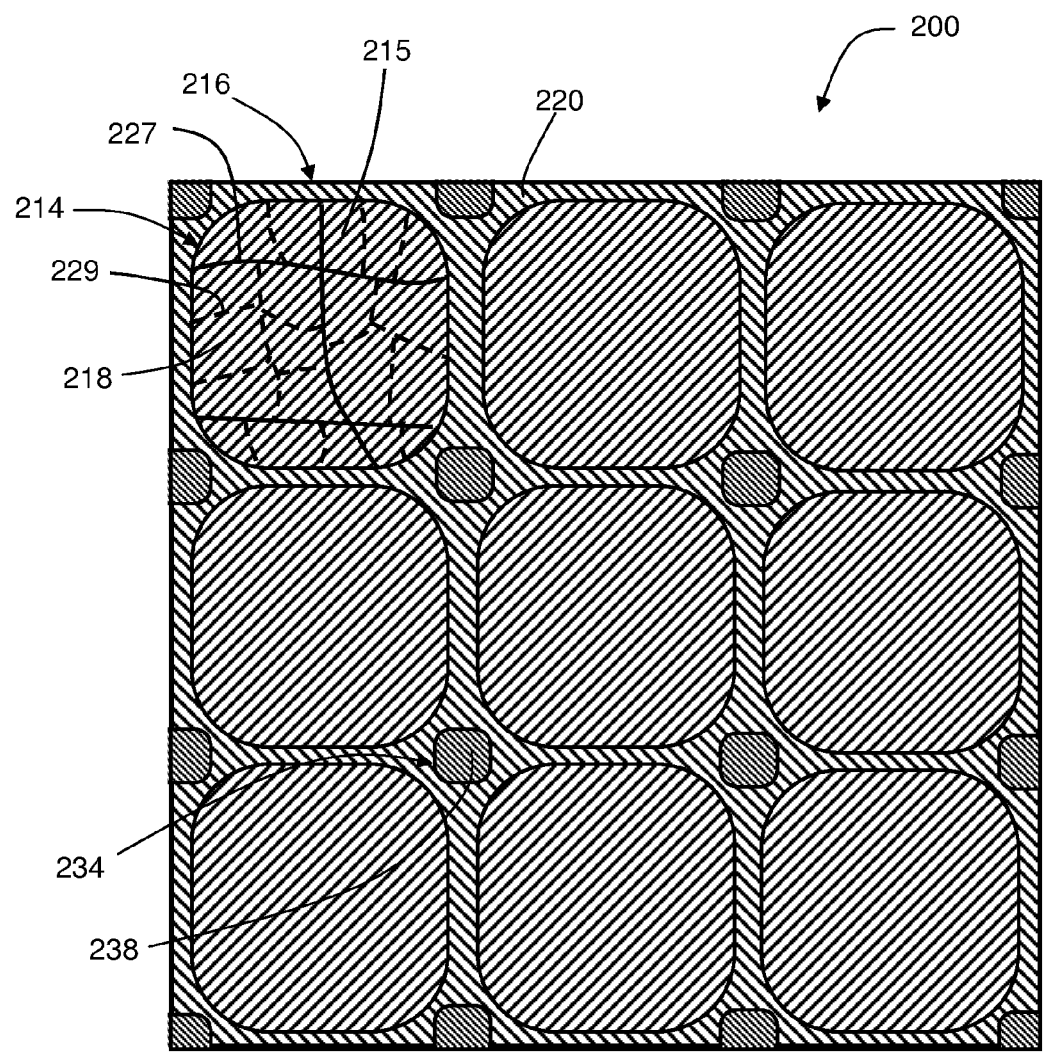
FIG. 2 is a schematic of illustration of an exemplary embodiment of the powder compact have an equiaxed configuration of dispersed particles as disclosed herein.

As illustrated in FIGS. 1 and 2, a powder 10 comprising powder particles 12, including a particle core 14 and core material 18 and metallic coating layer 16 and coating material 20, may be selected that is configured for compaction and sintering to provide a powder metal compact 200 that is lightweight (i.e., having a relatively low density), high-strength and is selectably and controllably removable from a wellbore in response to a change in a wellbore property, including being selectably and controllably dissolvable in an appropriate wellbore fluid, including various wellbore fluids as disclosed herein. The powder metal compact 200 includes a cellular nanomatrix 216 comprising a nanomatrix material 220 and a plurality of dispersed particles 214 comprising a particle core material 218 that comprises an Al—Cu—Mg, Al—Mn, Al—Si, Al—Mg, Al—Mg—Si, Al—Zn, Al—Zn—Cu, Al—Zn—Mg, Al—Zn—Cr, Al—Zn—Zr, or Al—Sn—Li alloy, or a combination thereof, dispersed in the cellular nanomatrix 216.

Dispersed particles 214 may comprise any of the materials described herein for particle cores 14, even though the chemical composition of dispersed particles 214 may be different due to diffusion effects as described herein. In an exemplary embodiment, dispersed particles 214 are formed from particle cores 14 comprising an Al—Cu—Mg, Al—Mn, Al—Si, Al—Mg, Al—Mg—Si, Al—Zn, Al—Zn—Cu, Al—Zn—Mg, Al—Zn—Cr, Al—Zn—Zr, or Al—Sn—Li alloy, or a combination thereof. In an exemplary embodiment, dispersed particles 214 include a particle core material 218 that comprises a 2000 series aluminum alloy, and more particularly may include, in weight percent of the alloy, about 0.05% to about 2.0% Mg; about 0.1% to about 0.8% Si; about 0.7% to about 6.0% Cu; about 0.1% to about 1.2% Mn; about 0.1% to about 0.8% Zn; about 0.05% to about 0.25% Ti; and about 0.1%-1.2% Fe; and the balance Al and incidental impurities. In another exemplary embodiment, dispersed particles 214 include a particle core material 218 that comprises a 5000 series aluminum alloy, and more particularly may include, in weight percent of the alloy, about 0.5% to about 6.0% Mg; about 0.05% to about 0.30% Zn; about 0.10% to about 1.0% Mn; about 0.08% to about 0.75% Si and the balance Al and incidental impurities. Dispersed particles 214 and particle core material 218 may also include a rare earth element, or a combination of rare earth elements. As used herein, rare earth elements include Sc, Y, La, Ce, Pr, Nd or Er, or a combination of rare earth elements. Where present, a rare earth element or combination of rare earth elements may be present, by weight, in an amount of about 5 percent or less.

Dispersed particle 214 and particle core material 218 may also comprise a nanostructured material 215. In an exemplary embodiment, a nanostructured material 215 is a material having a grain size, or a subgrain or crystallite size, less than about 200 nm, and more particularly a grain size of about 10 nm to about 200 nm, and even more particularly an average grain size less than about 100 nm. The nanostructure may include high angle boundaries 227, which are usually used to define the grain size, or low angle boundaries 229 that may occur as substructure within a particular grain, which are sometimes used to define a crystallite size, or a combination thereof. The nanostructure may be formed in the particle core 14 used to form dispersed particle 214 by any suitable method, including deformation-induced nanostructure such as may be provided by ball milling a powder to provide particle cores 14, and more particularly by cryomilling (e.g., ball milling in ball milling media at a cryogenic temperature or in a cryogenic fluid, such as liquid nitrogen) a powder to provide the particle cores 14 used to form dispersed particles 214. The particle cores 14 may be formed as a nanostructured material 215 by any suitable method, such as, for example, by milling or cryomilling of prealloyed powder particles of the aluminum alloys described herein. The particle cores 14 may also be formed by mechanical alloying of pure metal powders of the desired amounts of the various alloy constituents. Mechanical alloying involves ball milling, including cryomilling, of these powder constituents to mechanically enfold and intermix the constituents and form particle cores 14. In addition to the creation of nanostructure as described above, ball milling, including cryomilling, may contribute to solid solution strengthening of the particle core 14 and core material 18, which in turn contribute to solid solution strengthening of dispersed particle 214 and particle core material 218. The solid solution strengthening may result from the ability to mechanically intermix a higher concentration of interstitial or substitutional solute atoms in the solid solution than is possible in accordance with the particular alloy constituent phase equilibria, thereby providing an obstacle to, or serving to restrict, the movement of dislocations within the particle, which in turn provides a strengthening mechanism in particle core 14 and dispersed particle 214. Particle core 14 may also be formed as a nanostructured material 215 by methods including inert gas condensation, chemical vapor condensation, pulse electron deposition, plasma synthesis, crystallization of amorphous solids, electrodeposition and severe plastic deformation, for example. The nanostructure also may include a high dislocation density, such as, for example, a dislocation density between about $10^{17}$ m$^{-2}$ and $10^{18}$ m$^{-2}$, which may be two to three orders of magnitude higher than similar alloy materials deformed by traditional methods, such as cold rolling.

Dispersed particle 214 and particle core material 218 may also comprise a subparticle 222, and may preferably comprise a plurality of subparticles. Subparticle 222 provides a dispersion strengthening mechanism within dispersed particle 214 and provides an obstacle to, or serves to restrict, the movement of dislocations within the particle. Subparticle 222 may have any suitable size, and in an exemplary embodiment may have an average particle size of about 10 nm to about 1 micron, and more particularly may have an average particle size of about 50 nm to about 200 nm. Subparticle 222 may comprise any suitable form of subparticle, including an embedded subparticle 224, a precipitate 226 or a dispersoid 228. Embedded particle 224 may include any suitable embedded subparticle, including various hard subparticles. The embedded subparticle or plurality of embedded subparticles may include various metal, carbon, metal oxide, metal nitride, metal carbide, intermetallic compound or cermet particles, or a combination thereof. In an exemplary embodiment, hard particles may include Ni, Fe, Cu, Co, W, Al, Zn, Mn or Si, or an oxide, nitride, carbide, intermetallic compound or cermet comprising at least one of the foregoing, or a combination thereof. Embedded subparticle 224 may be embedded by any suitable method, including, for example, by ball milling or cryomilling hard particles together with the particle core material 18. A precipitate subparticle 226 may include any subparticle that may be precipitated within the dispersed particle 214, including precipitate subparticles 226 consistent with the phase equilibria of constituents of the aluminum alloy of interest and their relative amounts (e.g., a precipitation hardenable alloy), and including those that may be precipitated due to non-equilibrium conditions, such as may occur when an alloy constituent that has been forced into a solid solution of the alloy in an amount above its phase equilibrium limit, as is known to occur during mechanical alloying, is heated sufficiently to activate diffusion mechanisms that enable precipitation. Dispersoid subparticles 228 may include nanoscale particles or clusters of elements resulting from the manufacture of the particle cores 14, such as those associated with ball milling, including constituents of the milling media (e.g., balls) or the milling fluid (e.g., liquid nitrogen) or the surfaces of the particle cores 14 themselves (e.g., metallic oxides or nitrides). Dispersoid subparticles 228 may include, for example, Fe, Ni, Cr, Mn, N, O, C and H. The subparticles 222 may be located anywhere in conjunction with particle cores 14 and dispersed particles 214. In an exemplary embodiment, subparticles 222 may be disposed within or on the surface of dispersed particles 214, or a combination thereof, as illustrated in FIG. 1. In another exemplary embodiment, a plurality of subparticles 222 are disposed on the surface of the particle core 14 and dispersed particles 214 and may also comprise the nanomatrix material 216, as illustrated in FIG. 1.

Figure 3:
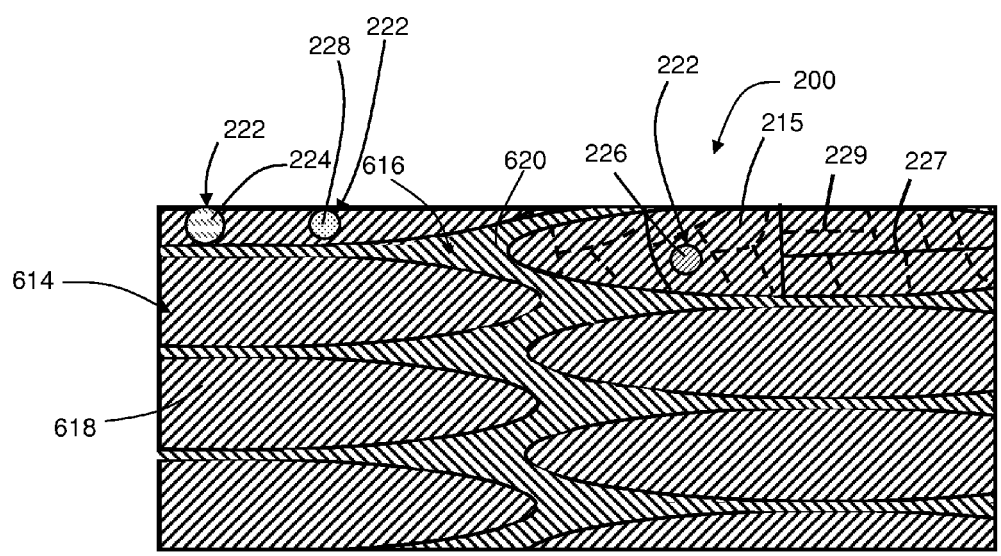
FIG. 3 is a schematic of illustration of an exemplary embodiment of the powder compact have a substantially elongated configuration of dispersed particles as disclosed herein.
Figure 4:
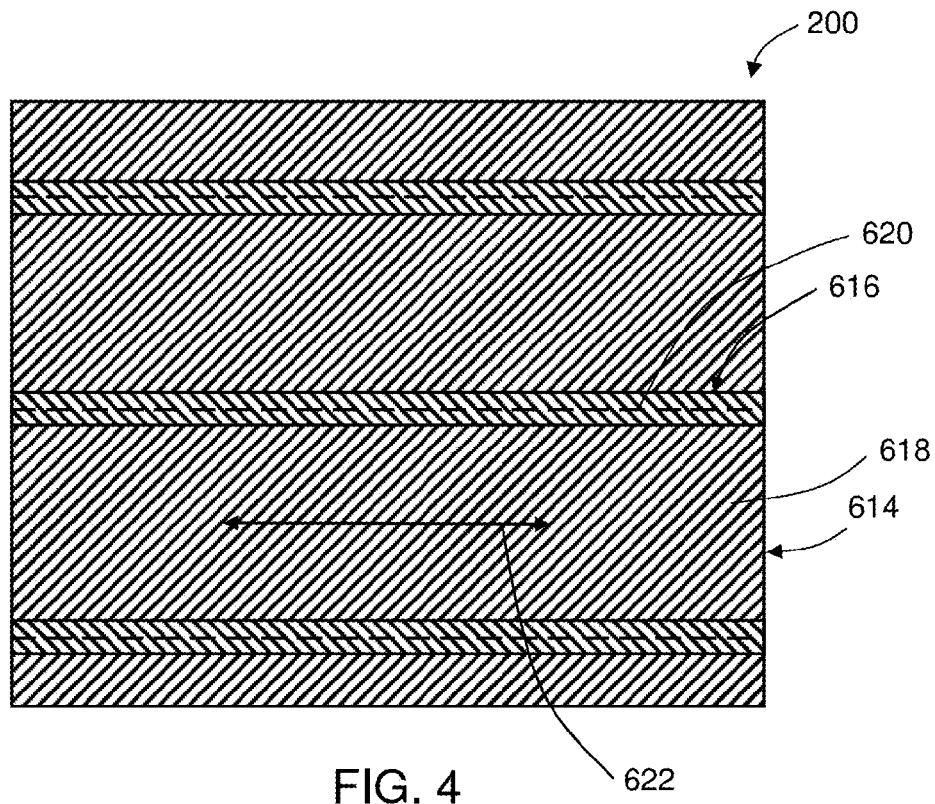
FIG. 4 is a schematic of illustration of an exemplary embodiment of the powder compact have a substantially elongated configuration of the cellular nanomatrix and dispersed particles, wherein the cellular nanomatrix and dispersed particles are substantially continuous.
Figure 5:
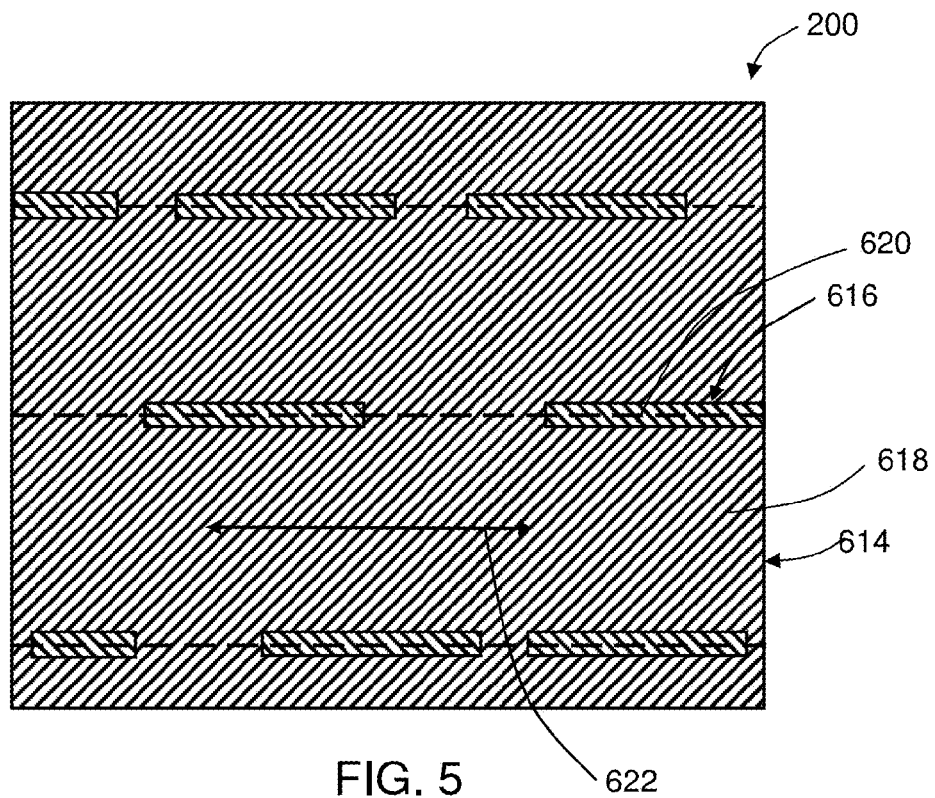
FIG. 5 is a schematic of illustration of an exemplary embodiment of the powder compact have a substantially elongated configuration of the cellular nanomatrix and dispersed particles, wherein the cellular nanomatrix and dispersed particles are substantially discontinuous.

Powder compact 200 includes a cellular nanomatrix 216 of a nanomatrix material 220 having a plurality of dispersed particles 214 dispersed throughout the cellular nanomatrix 216. The dispersed particles 214 may be equiaxed in a substantially continuous cellular nanomatrix 216, or may be substantially elongated as described herein and illustrated in FIG. 3. In the case where the dispersed particles 214 are substantially elongated, the dispersed particles 214 and the cellular nanomatrix 216 may be continuous or discontinuous, as illustrated in FIGS. 4 and 5, respectively. The substantially-continuous cellular nanomatrix 216 and nanomatrix material 220 formed of sintered metallic coating layers 16 is formed by the compaction and sintering of the plurality of metallic coating layers 16 of the plurality of powder particles 12, such as by CIP, HIP or dynamic forging. The chemical composition of nanomatrix material 220 may be different than that of coating material 20 due to diffusion effects associated with the sintering. Powder metal compact 200 also includes a plurality of dispersed particles 214 that comprise particle core material 218. Dispersed particle cores 214 and core material 218 correspond to and are formed from the plurality of particle cores 14 and core material 18 of the plurality of powder particles 12 as the metallic coating layers 16 are sintered together to form nanomatrix 216. The chemical composition of core material 218 may also be different than that of core material 18 due to diffusion effects associated with sintering.

As used herein, the use of the term cellular nanomatrix 216 does not connote the major constituent of the powder compact, but rather refers to the minority constituent or constituents, whether by weight or by volume. This is distinguished from most matrix composite materials where the matrix comprises the majority constituent by weight or volume. The use of the term substantially-continuous, cellular nanomatrix is intended to describe the extensive, regular, continuous and interconnected nature of the distribution of nanomatrix material 220 within powder compact 200. As used herein, "substantially-continuous" describes the extension of the nanomatrix material throughout powder compact 200 such that it extends between and envelopes substantially all of the dispersed particles 214. Substantially-continuous is used to indicate that complete continuity and regular order of the nanomatrix around each dispersed particle 214 is not required. For example, defects in the coating layer 16 over particle core 14 on some powder particles 12 may cause bridging of the particle cores 14 during sintering of the powder compact 200, thereby causing localized discontinuities to result within the cellular nanomatrix 216, even though in the other portions of the powder compact the nanomatrix is substantially continuous and exhibits the structure described herein. In contrast, in the case of substantially elongated dispersed particles 214, such as those formed by extrusion, "substantially discontinuous" is used to indicate that incomplete continuity and disruption (e.g., cracking or separation) of the nanomatrix around each dispersed particle 214, such as may occur in a predetermined extrusion direction 622, or a direction transverse to this direction. As used herein, "cellular" is used to indicate that the nanomatrix defines a network of generally repeating, interconnected, compartments or cells of nanomatrix material 220 that encompass and also interconnect the dispersed particles 214. As used herein, "nanomatrix" is used to describe the size or scale of the matrix, particularly the thickness of the matrix between adjacent dispersed particles 214. The metallic coating layers that are sintered together to form the nanomatrix are themselves nanoscale thickness coating layers. Since the nanomatrix at most locations, other than the intersection of more than two dispersed particles 214, generally comprises the interdiffusion and bonding of two coating layers 16 from adjacent powder particles 12 having nanoscale thicknesses, the matrix formed also has a nanoscale thickness (e.g., approximately two times the coating layer thickness as described herein) and is thus described as a nanomatrix. Further, the use of the term dispersed particles 214 does not connote the minor constituent of powder compact 200, but rather refers to the majority constituent or constituents, whether by weight or by volume. The use of the term dispersed particle is intended to convey the discontinuous and discrete distribution of particle core material 218 within powder compact 200.

Powder compact 200 may have any desired shape or size, including that of a cylindrical billet, bar, sheet or other form that may be machined, formed or otherwise used to form useful articles of manufacture, including various wellbore tools and components. The pressing used to form precursor powder compact 100 and sintering and pressing processes used to form powder compact 200 and deform the powder particles 12, including particle cores 14 and coating layers 16, to provide the full density and desired macroscopic shape and size of powder compact 200 as well as its microstructure. The morphology (e.g. equiaxed or substantially elongated) of the dispersed particles 214 and cellular network 216 of particle layers results from sintering and deformation of the powder particles 12 as they are compacted and interdiffuse and deform to fill the interparticle spaces 15 (FIG. 1). The sintering temperatures and pressures may be selected to ensure that the density of powder compact 200 achieves substantially full theoretical density.

In an exemplary embodiment, dispersed particles 214 are formed from particle cores 14 dispersed in the cellular nanomatrix 216 of sintered metallic coating layers 16, and the nanomatrix 216 includes a solid-state metallurgical bond or bond layer, extending between the dispersed particles 214 throughout the cellular nanomatrix 216 that is formed at a sintering temperature ($T_S$), where $T_S$ is less than the melting temperature of the coating ($T_C$) and the melting temperature of the particle ($T_P$). As indicated, solid-state metallurgical bond is formed in the solid state by solid-state interdiffusion between the coating layers 16 of adjacent powder particles 12 that are compressed into touching contact during the compaction and sintering processes used to form powder compact 200, as described herein. As such, sintered coating layers 16 of cellular nanomatrix 216 include a solid-state bond layer that has a thickness defined by the extent of the interdiffusion of the coating materials 20 of the coating layers 16, which will in turn be defined by the nature of the coating layers 16, including whether they are single or multilayer coating layers, whether they have been selected to promote or limit such interdiffusion, and other factors, as described herein, as well as the sintering and compaction conditions, including the sintering time, temperature and pressure used to form powder compact 200.

As nanomatrix 216 is formed, including the metallurgical bond and bond layer, the chemical composition or phase distribution, or both, of metallic coating layers 16 may change. Nanomatrix 216 also has a melting temperature ($T_M$). As used herein, $T_M$ includes the lowest temperature at which incipient melting or liquation or other forms of partial melting will occur within nanomatrix 216, regardless of whether nanomatrix material 220 comprises a pure metal, an alloy with multiple phases each having different melting temperatures or a composite, including a composite comprising a plurality of layers of various coating materials having different melting temperatures, or a combination thereof, or otherwise. As dispersed particles 214 and particle core materials 218 are formed in conjunction with nanomatrix 216, diffusion of constituents of metallic coating layers 16 into the particle cores 14 is also possible, which may result in changes in the chemical composition or phase distribution, or both, of particle cores 14. As a result, dispersed particles 214 and particle core materials 218 may have a melting temperature ($T_{DP}$) that is different than $T_P$. As used herein, $T_{DP}$ includes the lowest temperature at which incipient melting or liquation or other forms of partial melting will occur within dispersed particles 214, regardless of whether particle core material 218 comprise a pure metal, an alloy with multiple phases each having different melting temperatures or a composite, or otherwise. In one embodiment, powder compact 200 is formed at a sintering temperature ($T_S$), where $T_S$ is less than $T_C$, $T_P$, $T_M$ and $T_{DP}$, and the sintering is performed entirely in the solid-state resulting in a solid-state bond layer. In another exemplary embodiment, powder compact 200 is formed at a sintering temperature ($T_S$), where $T_S$ is greater than or equal to one or more of $T_C$, $T_P$, $T_M$ or $T_{DP}$ and the sintering includes limited or partial melting within the powder compact 200 as described herein, and further may include liquid-state or liquid-phase sintering resulting in a bond layer that is at least partially melted and resolidified. In this embodiment, the combination of a predetermined $T_S$ and a predetermined sintering time ($t_S$) will be selected to preserve the desired microstructure that includes the cellular nanomatrix 216 and dispersed particles 214. For example, localized liquation or melting may be permitted to occur, for example, within all or a portion of nanomatrix 216 so long as the cellular nanomatrix 216/dispersed particle 214 morphology is preserved, such as by selecting particle cores 14, $T_S$ and $t_S$ that do not provide for complete melting of particle cores. Similarly, localized liquation may be permitted to occur, for example, within all or a portion of dispersed particles 214 so long as the cellular nanomatrix 216/dispersed particle 214 morphology is preserved, such as by selecting metallic coating layers 16, $T_S$ and $t_S$ that do not provide for complete melting of the coating layer or layers 16. Melting of metallic coating layers 16 may, for example, occur during sintering along the metallic layer 16/particle core 14 interface, or along the interface between adjacent layers of multi-layer coating layers 16. It will be appreciated that combinations of $T_S$ and $t_S$ that exceed the predetermined values may result in other microstructures, such as an equilibrium melt/resolidification microstructure if, for example, both the nanomatrix 216 (i.e., combination of metallic coating layers 16) and dispersed particles 214 (i.e., the particle cores 14) are melted, thereby allowing rapid interdiffusion of these materials.

Particle cores 14 and dispersed particles 214 of powder compact 200 may have any suitable particle size. In an exemplary embodiment, the particle cores 14 may have a unimodal distribution and an average particle diameter or size of about 5 µm to about 300 µm, more particularly about 80 µm to about 120 µm, and even more particularly about 100 µm. In another exemplary embodiment, which may include a multi-modal distribution of particle sizes, the particle cores 14 may have average particle diameters or size of about 50 nm to about 500 µm, more particularly about 500 nm to about 300 µm, and even more particularly about 5 µm to about 300 µm. In an exemplary embodiment, the particle cores 14 or the dispersed particles may have an average particle size of about 50 nm to about 500 µm.

Dispersed particles 214 may have any suitable shape depending on the shape selected for particle cores 14 and powder particles 12, as well as the method used to sinter and compact powder 10. In an exemplary embodiment, powder particles 12 may be spheroidal or substantially spheroidal and dispersed particles 214 may include an equiaxed particle configuration as described herein. In another exemplary embodiment, dispersed particles may have a non-spherical shape. In yet another embodiment, the dispersed particles may be substantially elongated in a predetermined extrusion direction 622, such as may occur when using extrusion to form powder compact 200. As illustrated in FIG. 3-5, for example, a substantially elongated cellular nanomatrix 616 comprising a network of interconnected elongated cells of nanomatrix material 620 having a plurality of substantially elongated dispersed particle cores 614 of core material 618 disposed within the cells. Depending on the amount of deformation imparted to form elongated particles, the elongated coating layers and the nanomatrix 616 may be substantially continuous in the predetermined direction 622 as shown in FIG. 4, or substantially discontinuous as shown in FIG. 5.

The nature of the dispersion of dispersed particles 214 may be affected by the selection of the powder 10 or powders 10 used to make particle compact 200. In one exemplary embodiment, a powder 10 having a unimodal distribution of powder particle 12 sizes may be selected to form powder compact 200 and will produce a substantially homogeneous unimodal dispersion of particle sizes of dispersed particles 214 within cellular nanomatrix 216. In another exemplary embodiment, a plurality of powders 10 having a plurality of powder particles with particle cores 14 that have the same core materials 18 and different core sizes and the same coating material 20 may be selected and uniformly mixed as described herein to provide a powder 10 having a homogenous, multimodal distribution of powder particle 12 sizes, and may be used to form powder compact 200 having a homogeneous, multimodal dispersion of particle sizes of dispersed particles 214 within cellular nanomatrix 216. Similarly, in yet another exemplary embodiment, a plurality of powders 10 having a plurality of particle cores 14 that may have the same core materials 18 and different core sizes and the same coating material 20 may be selected and distributed in a non-uniform manner to provide a non-homogenous, multimodal distribution of powder particle sizes, and may be used to form powder compact 200 having a non-homogeneous, multimodal dispersion of particle sizes of dispersed particles 214 within cellular nanomatrix 216. The selection of the distribution of particle core size may be used to determine, for example, the particle size and interparticle spacing of the dispersed particles 214 within the cellular nanomatrix 216 of powder compacts 200 made from powder 10.

As illustrated generally in FIGS. 1 and 2, powder metal compact 200 may also be formed using coated metallic powder 10 and an additional or second powder 30, as described herein. The use of an additional powder 30 provides a powder compact 200 that also includes a plurality of dispersed second particles 234, as described herein, that are dispersed within the nanomatrix 216 and are also dispersed with respect to the dispersed particles 214. Dispersed second particles 234 may be formed from coated or uncoated second powder particles 32, as described herein. In an exemplary embodiment, coated second powder particles 32 may be coated with a coating layer 36 that is the same as coating layer 16 of powder particles 12, such that coating layers 36 also contribute to the nanomatrix 216. In another exemplary embodiment, the second powder particles 232 may be uncoated such that dispersed second particles 234 are embedded within nanomatrix 216. As disclosed herein, powder 10 and additional powder 30 may be mixed to form a homogeneous dispersion of dispersed particles 214 and dispersed second particles 234 or to form a non-homogeneous dispersion of these particles. The dispersed second particles 234 may be formed from any suitable additional powder 30 that is different from powder 10, either due to a compositional difference in the particle core 34, or coating layer 36, or both of them, and may include any of the materials disclosed herein for use as second powder 30 that are different from the powder 10 that is selected to form powder compact 200. In an exemplary embodiment, dispersed second particles 234 may include Ni, Fe, Cu, Co, W, Al, Zn, Mn or Si, or an oxide, nitride, carbide, intermetallic compound or cermet comprising at least one of the foregoing, or a combination thereof.

Nanomatrix 216 is a substantially-continuous, cellular network of metallic coating layers 16 that are sintered to one another. The thickness of nanomatrix 216 will depend on the nature of the powder 10 or powders 10 used to form powder compact 200, as well as the incorporation of any second powder 30, particularly the thicknesses of the coating layers associated with these particles. In an exemplary embodiment, the thickness of nanomatrix 216 is substantially uniform throughout the microstructure of powder compact 200 and comprises about two times the thickness of the coating layers 16 of powder particles 12. In another exemplary embodiment, the cellular network 216 has a substantially uniform average thickness between dispersed particles 214 of about 50 nm to about 5000 nm. Powder compacts 200 formed by extrusion may have much smaller thicknesses, and may become non-uniform and substantially discontinuous, as described herein.

Nanomatrix 216 is formed by sintering metallic coating layers 16 of adjacent particles to one another by interdiffusion and creation of bond layer as described herein. Metallic coating layers 16 may be single layer or multilayer structures, and they may be selected to promote or inhibit diffusion, or both, within the layer or between the layers of metallic coating layer 16, or between the metallic coating layer 16 and particle core 14, or between the metallic coating layer 16 and the metallic coating layer 16 of an adjacent powder particle, the extent of interdiffusion of metallic coating layers 16 during sintering may be limited or extensive depending on the coating thicknesses, coating material or materials selected, the sintering conditions and other factors. Given the potential complexity of the interdiffusion and interaction of the constituents, description of the resulting chemical composition of nanomatrix 216 and nanomatrix material 220 may be simply understood to be a combination of the constituents of coating layers 16 that may also include one or more constituents of dispersed particles 214, depending on the extent of interdiffusion, if any, that occurs between the dispersed particles 214 and the nanomatrix 216. Similarly, the chemical composition of dispersed particles 214 and particle core material 218 may be simply understood to be a combination of the constituents of particle core 14 that may also include one or more constituents of nanomatrix 216 and nanomatrix material 220, depending on the extent of interdiffusion, if any, that occurs between the dispersed particles 214 and the nanomatrix 216.

In an exemplary embodiment, the nanomatrix material 220 has a chemical composition and the particle core material 218 has a chemical composition that is different from that of nanomatrix material 220, and the differences in the chemical compositions may be configured to provide a selectable and controllable dissolution rate, including a selectable transition from a very low dissolution rate to a very rapid dissolution rate, in response to a controlled change in a property or condition of the wellbore proximate the compact 200, including a property change in a wellbore fluid that is in contact with the powder compact 200, as described herein. Nanomatrix 216 may be formed from powder particles 12 having single layer and multilayer coating layers 16. This design flexibility provides a large number of material combinations, particularly in the case of multilayer coating layers 16, that can be utilized to tailor the cellular nanomatrix 216 and composition of nanomatrix material 220 by controlling the interaction of the coating layer constituents, both within a given layer, as well as between a coating layer 16 and the particle core 14 with which it is associated or a coating layer 16 of an adjacent powder particle 12.

In an exemplary embodiment, nanomatrix 216 may comprise a nanomatrix material 220 comprising Ni, Fe, Cu, Co, W, Al, Zn, Mn, Mg or Si, or an alloy thereof, or an oxide, nitride, carbide, intermetallic compound or cermet comprising at least one of the foregoing, or a combination thereof.

The powder metal compacts 200 disclosed herein may be configured to provide selectively and controllably disposable, degradable, dissolvable, corrodible or otherwise removable from a wellbore using a predetermined wellbore fluid, including those described herein. These materials may be configured to provide a rate of corrosion up to about 400 mg/cm$^2$/hr, and more particularly a rate of corrosion of about 0.2 to about 50 mg/cm$^2$/hr. These powder compacts 200 may also be configured to provide high strength, including an ultimate compressive strength up to about 150 ksi, and more particularly from about 60 ksi to about 150 ksi, and even more particularly from greater than about 60 ksi to about 120 ksi.

The terms "a" and "an" herein do not denote a limitation of quantity, but rather denote the presence of at least one of the referenced items. The modifier "about" used in connection with a quantity is inclusive of the stated value and has the meaning dictated by the context (e.g., includes the degree of error associated with measurement of the particular quantity). Furthermore, unless otherwise limited all ranges disclosed herein are inclusive and combinable (e.g., ranges of "up to about 25 weight percent (wt. %), more particularly about 5 wt. % to about 20 wt. % and even more particularly about 10 wt. % to about 15 wt. %" are inclusive of the endpoints and all intermediate values of the ranges, e.g., "about 5 wt. % to about 25 wt. %, about 5 wt. % to about 15 wt. %", etc.). The use of "about" in conjunction with a listing of constituents of an alloy composition is applied to all of the listed constituents, and in conjunction with a range to both endpoints of the range. Finally, unless defined otherwise, technical and scientific terms used herein have the same meaning as is commonly understood by one of skill in the art to which this invention belongs. The suffix "(s)" as used herein is intended to include both the singular and the plural of the term that it modifies, thereby including one or more of that term (e.g., the metal(s) includes one or more metals). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments.

It is to be understood that the use of "comprising" in conjunction with the alloy compositions described herein specifically discloses and includes the embodiments wherein the alloy compositions "consist essentially of" the named components (i.e., contain the named components and no other components that significantly adversely affect the basic and novel features disclosed), and embodiments wherein the alloy compositions "consist of" the named components (i.e., contain only the named components except for contaminants which are naturally and inevitably present in each of the named components). While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A powder metal compact, comprising:
   a cellular nanomatrix comprising a nanomatrix material, wherein the nanomatrix material comprises Mg, or an oxide, nitride, carbide, intermetallic compound, or cermet thereof, or a combination of Mg and at least one of Ni, Fe, Cu, Co, W, Al, Zn, Mn, or Si; and
   a plurality of dispersed particles comprising a particle core material that comprises an Al—Cu—Mg, Al—Mn, Al—Si, Al—Mg, Al—Mg—Si, Al—Zn, Al—Zn—Cu, Al—Zn—Mg, Al—Zn—Cr, Al—Zn—Zr, or Al—Sn—Li alloy, or a combination thereof, dispersed in the cellular nanomatrix.

2. The powder metal compact of claim 1, wherein the particle core material comprises, in weight percent of the alloy, about 0.05% to about 2.0% Mg; about 0.1% to about 0.8% Si; about 0.7% to about 6.0% Cu; about 0.1% to about 1.2% Mn; about 0.1% to about 0.8% Zn; about 0.05% to about 0.25% Ti; and about 0.1%-1.2% Fe; and the balance Al and incidental impurities.

3. The powder metal compact of claim 1, wherein the particle core material comprises, in weight percent of the alloy, about 0.5% to about 6.0% Mg; about 0.05% to about 0.30% Zn; about 0.10% to about 1.0% Mn; about 0.08% to about 0.75% Si and the balance Al and incidental impurities.

4. The powder metal compact of claim 1, wherein the particle core material or the nanomatrix material, or a combination thereof, comprises a nanostructured material.

5. The powder metal compact of claim 4, wherein the nanostructured material has a grain size less than about 200 nm.

6. The powder metal compact of claim 5, wherein the nanostructured material has a grain size of about 10 nm to about 200 nm.

7. The powder metal compact of claim 4, wherein the nanostructured material has an average grain size less than about 100 nm.

8. The powder metal compact of claim 1, wherein the dispersed particle further comprises a subparticle.

9. The powder metal compact of claim 8, wherein the subparticle has an average particle size of about 10 nm to about 1 micron.

10. The powder metal compact of claim 8, wherein the subparticle comprises a preformed subparticle, a precipitate or a dispersoid.

11. The powder metal compact of claim 8, wherein the subparticle is disposed within or on the surface of the dispersed particle, or a combination thereof.

12. The powder metal compact of claim 11, wherein the subparticle is disposed on the surface of the dispersed particle and also comprises the nanomatrix material.

13. The powder metal compact of claim 1, wherein the dispersed particles have an average particle size of about 50 nm to about 500 μm.

14. The powder metal compact of claim 1, wherein the dispersed particles comprise a multi-modal distribution of particle sizes within the cellular nanomatrix.

15. The powder metal compact of claim 1, wherein the particle core material further comprises a rare earth element.

16. The powder metal compact of claim 1, wherein the dispersed particles have an equiaxed particle shape and the nanomatrix is substantially continuous.

17. The powder metal compact of claim 1, wherein the nanomatrix and the dispersed particles are substantially elongated in a predetermined direction.

18. The powder metal compact of claim 17, wherein the nanomatrix is substantially continuous.

19. The powder metal compact of claim 17, wherein the nanomatrix is substantially discontinuous.

20. The powder metal compact of claim 1, further comprising a plurality of dispersed second particles, wherein the dispersed second particles are also dispersed within the cellular nanomatrix and with respect to the dispersed particles.

21. The powder metal compact of claim 20, wherein the dispersed second particles comprise a metal, carbon, metal oxide, metal nitride, metal carbide, intermetallic compound or cermet, or a combination thereof.

22. The powder metal compact of claim 21, wherein the dispersed second particles comprise Ni, Fe, Cu, Co, W, Al, Zn, Mn, Mg or Si, or an oxide, nitride, carbide, intermetallic compound or cermet comprising at least one of the foregoing, or a combination thereof.

23. The powder metal compact of claim 1, wherein the nanomatrix material comprises a constituent of a milling medium or a milling fluid.

24. The powder metal compact of claim 1, wherein the nanomatrix material comprises a multilayer material.

25. The powder metal compact of claim 1, wherein the nanomatrix material has a chemical composition and the particle core material has a chemical composition that is different than the chemical composition of the nanomatrix material.

26. The powder metal compact of claim 1, wherein the cellular nanomatrix has an average thickness of about 50 nm to about 5000 nm.

27. The powder metal compact of claim 1, further comprising a bond layer extending throughout the cellular nanomatrix between the dispersed particles.

28. The powder metal compact of claim 27, wherein the bond layer comprises a substantially solid state bond layer.

* * * * *